US011862833B2

(12) United States Patent
Marcinčák et al.

(10) Patent No.: US 11,862,833 B2
(45) Date of Patent: Jan. 2, 2024

(54) COUPLING ASSEMBLY INCLUDING A FIRST WAVEGUIDE WITH A FIRST END AND SECOND WAVEGUIDE WITH A SECOND END, WHERE A LOCKING MECHANISM CONNECTS THE FIRST END TO THE SECOND END

(71) Applicant: NETQUI j.s.a., Humenne (SK)

(72) Inventors: Martin Marcinčák, Humenné (SK); Peter Švihura, Humenné (SK); Pavol Capek, Stupava (SK)

(73) Assignee: NETQUI J.S.A., Humenne (SK)

( * ) Notice: Subject to any disclaimer, the term of this patent is extended or adjusted under 35 U.S.C. 154(b) by 18 days.

(21) Appl. No.: 17/324,901

(22) Filed: May 19, 2021

(65) Prior Publication Data

US 2022/0376374 A1 Nov. 24, 2022

(51) Int. Cl.
*H01P 1/04* (2006.01)
*H01P 3/12* (2006.01)
*H01P 5/02* (2006.01)

(52) U.S. Cl.
CPC ................ *H01P 1/042* (2013.01); *H01P 3/12* (2013.01); *H01P 5/02* (2013.01)

(58) Field of Classification Search
CPC ........................................................ H01P 1/042
USPC .......................................................... 333/254
See application file for complete search history.

(56) References Cited

U.S. PATENT DOCUMENTS

| | | | | |
|---|---|---|---|---|
| 2,774,616 A * | 12/1956 | Dodd et al. | H01P 1/042 | 285/388 |
| 2,923,994 A * | 2/1960 | Johnson | F16B 2/02 | 439/806 |
| 3,039,797 A * | 6/1962 | Harper et al. | H01P 1/042 | 403/336 |
| 3,817,805 A * | 6/1974 | Surikov et al. | B23K 9/0282 | 156/304.6 |
| 4,962,991 A * | 10/1990 | Carvalho | H01P 1/042 | 385/56 |
| 6,448,875 B1 * | 9/2002 | Sciarrino | H01P 3/14 | 333/248 |
| 2007/0252665 A1 * | 11/2007 | Voss et al. | H01P 1/062 | 333/254 |

* cited by examiner

*Primary Examiner* — Benny T Lee
(74) *Attorney, Agent, or Firm* — Ohlandt, Greeley and Perle, LLP

(57) ABSTRACT

A coupling assembly is provided. More specifically, the coupling assembly is configured to form a quick, preferably mechanical and electromagnetic, connection between two devices such as a radio and antenna. The coupling assembly has interchangeable portions can be easily adjusted or adapted to swap parts such as waveguides having different sizes and dimensions while maintaining a standard connection portion that can be used with the different sized and shaped parts, thereby reducing manufacturing costs and increasing the efficiency of field installations.

16 Claims, 30 Drawing Sheets

COUPLING ASSEMBLY INCLUDING A FIRST WAVEGUIDE WITH A FIRST END AND SECOND WAVEGUIDE WITH A SECOND END, WHERE A LOCKING MECHANISM CONNECTS THE FIRST END TO THE SECOND END

BACKGROUND

1. Field of the Disclosure

The present disclosure generally relates to coupling assemblies. Particularly, the present disclosure relates to coupling assemblies that are configured to form a quick, preferably mechanical and electromagnetic, connection between two devices. More particularly, the coupling assemblies of the present disclosure are suited for use in connecting devices in the form of a radio and an antenna to one another.

2. Description of Related Art

Conventional coupling assemblies can connect two devices to one another in mechanical, optical, fluidic, electric, electromagnetic or other manners. There can be several sizes of these conventional coupling devices, having different dimensions, that require multiple different coupling assemblies to match varying inside shapes, openings and cross sections. As the required sizes, dimensions and shapes of these coupling devices are selected based on the needs of the device and the type of devices being connected, these varying requirements present both practical and manufacturing problems as these devices usually require custom fabrication. With regards to connecting two devices together such as radios and antennas, these aforementioned issues raise manufacturing costs and increase the difficulty of field installations when radios and antennas must be connected via waveguide interfaces that have varying dimensions and different waveguide shapes.

These conventional waveguide interfaces or coupling assemblies often require specific tools for these custom fabricated couplings, which increase the costs and difficulty of field installations.

SUMMARY OF THE DISCLOSURE

The present disclosure efficiently addresses the aforementioned problems and solves the issues and/or improves conventional coupling assemblies.

The present disclosure provides for a quick coupling assembly having a fixed or single size for a wide range of dimensions of devices to be connected and disconnected in combination with mechanical and electromagnetic connection means, such as connecting a radio to an antenna via waveguide interface. Each radio and antenna pair can operate in a particular frequency band, each requiring or having different waveguide dimensions suitable for that particular frequency band. The present quick coupling assembly can accommodate these various waveguides having different shapes and sizes as the coupling assembly shares a fixed or single sized quick coupling interface or locking mechanism.

The present coupling assembly is designed to allow connections and disconnections by easy and quick means, without the need for specific tools, by using bare hands, and allows connections and disconnections of varying devices such as radios and antennas to be performed in restricted conditions such as field installations. The present coupling assembly thereby increases the efficiency of these field installations and solves various manufacturing problems and reduces costs.

BRIEF DESCRIPTION OF THE DRAWINGS

A component or a feature that can be common to more than one embodiment or drawing is indicated with the same reference number in each of the drawings and the detailed descriptions thereof.

DETAILED DESCRIPTION OF THE DISCLOSURE

Figure 1:
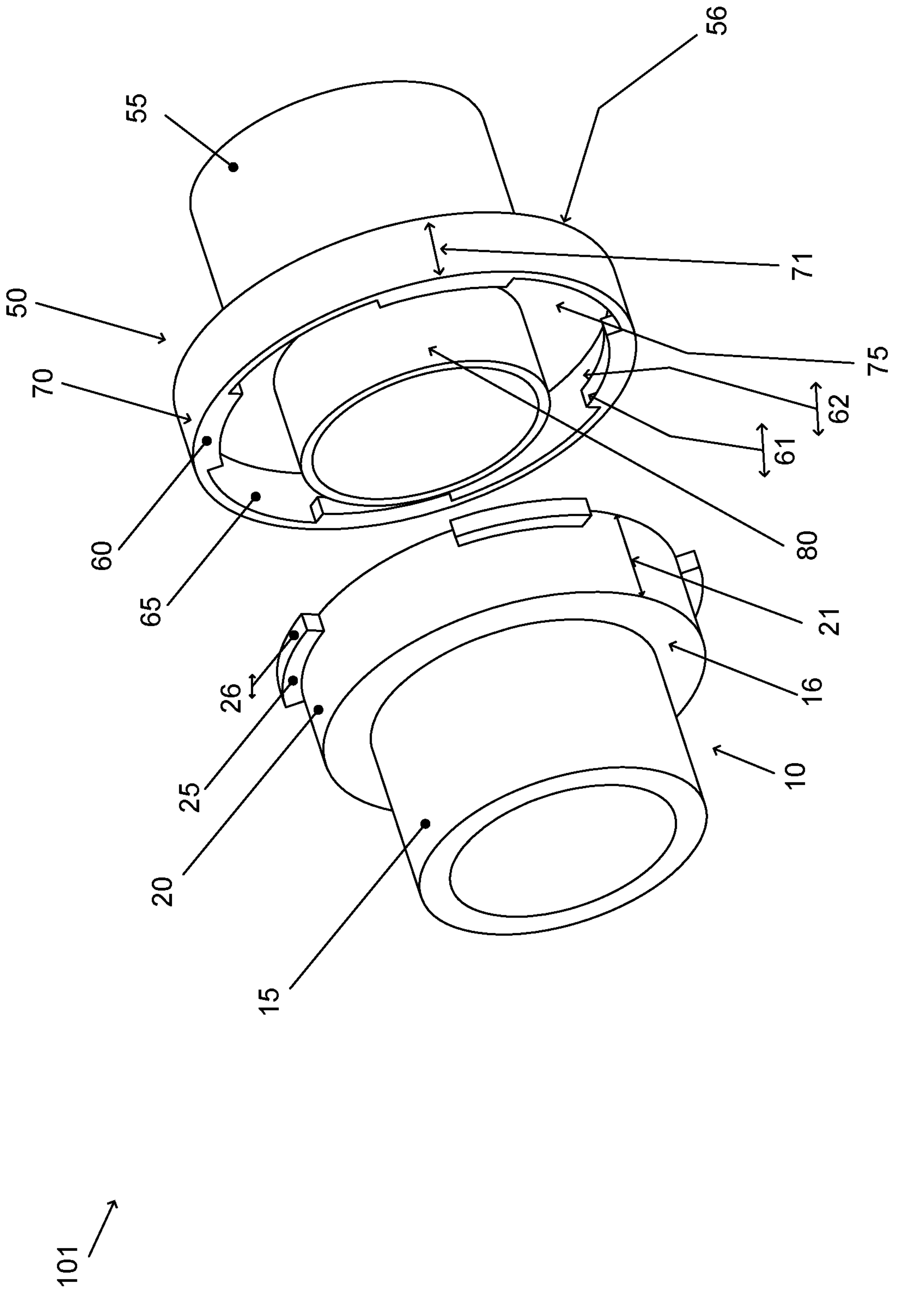
FIG. 1 is a perspective view of an embodiment of the coupling assembly having a circular waveguide.

FIG. 1 shows a perspective view of a coupling assembly 101 according to the present disclosure. Coupling assembly 101 has a first portion 10 that can be connected and disconnected via a bayonet locking mechanism by a user, easily by hand to a second portion 50. First portion 10 has a first waveguide portion 15 that is joined to and/or connectable to a hollow cylindrical portion 20. The first waveguide portion 15 of coupling assembly 101 is circular, so that the waveguide portion 15 is a hollow cylindrical tube. In some embodiments, waveguide portion 15 has an outer diameter that is less than the outer diameter of hollow cylindrical portion 20. At the interface or point of connection between portion 15 and portion 20, there is a flat surface 16 that is perpendicular to a central axis of the coupling assembly 101 that extends through the center of the hollow circular waveguide 15. Flat surface 16 has a varying surface area, that increases when the outer diameter of waveguide portion 15 decreases and decreases when the outer diameter of waveguide portion 15 increases. In some embodiments, waveguide portion 15, flat surface 16 and cylindrical portion

20 are a single unitary piece. In some embodiments, first waveguide portion 15 provides a connection for a first device such as an antenna.

In some embodiments, cylindrical portion 20 has four protrusions 25, for use in locking and unlocking first portion 10 and second portion 50 together. In some embodiments, cylindrical portion 20 has at least one, or least two or at least four protrusions 25. In some embodiments, four protrusions are preferred, as this embodiment allows axial alignment of the antenna and radio in 90-degree steps reflecting Vertical and Horizontal polarization planes of the linear polarization of both electromagnetic waves radiating from the antenna and fields inside of the waveguides.

Protrusions 25 are located on the outer edge of the circumference of the cylindrical portion 20 that is closest to the second portion 50 when the first and second portions are connected. Protrusions 25 extend outward from the cylindrical portion 20 in a perpendicular direction to the central axis of the coupling assembly 101. If more than one protrusion 25 is present in a particular embodiment of the coupling assembly, then these protrusions are spaced equidistant from each other along the circumference of the cylindrical portion 20. Cylindrical portion 20, has a width 21. Each protrusion 25 has a width 26 that is less than width 21 of Cylindrical portion 20. Protrusion 25 is part of a first portion of a bayonet locking mechanism that works in conjunction with the second portion of the mechanism located on second portion 50.

Second portion 50 has a second waveguide portion 55 that is joined to and/or connectable to a hollow cylindrical portion 70. The second waveguide portion 55 of coupling assembly 101 is circular, so that the waveguide portion 55 is a hollow cylindrical tube. In some embodiments, waveguide portion 55 has an outer diameter that is less than the outer diameter of hollow cylindrical portion 70. At the interface or point of connection between portion 55 and portion 70, there is a flat surface 56 that is perpendicular to the central axis of the coupling assembly 101 that extends through the center of the waveguide 55. In some embodiments, flat surface 56 has a varying surface area, that increases when the outer diameter of waveguide portion 55 decreases and decreases when the outer diameter of waveguide portion 55 increases. In some embodiments, waveguide portion 55, flat surface 56 and cylindrical portion 70 are a single unitary piece. In some embodiments, second waveguide portion 55 provides a connection for a second device such as a radio.

Second portion 50 has an inner cylindrical tube portion 80 that interconnects with the inner portion of hollow cylindrical portion 20 and the inner portion of first waveguide portion 15, when the second portion 50 is connected via the bayonet locking mechanism to the first portion 10. In some embodiments, the inner diameter of the cylindrical tube portion 80 matches the inner diameter of the waveguide portion 15. In some embodiments, the inner diameter of the cylindrical tube portion 80 is less than the inner diameter of the first waveguide portion 15.

In some embodiments, the inner cylindrical tube portion 80 and the second waveguide portion 55, are joined as a single unitary piece, that is connected as shown in FIG. 1, with cylindrical tube portion 70. Cylindrical tube portion 70 has a flat surface 56 on the side adjacent to second waveguide portion 55 as shown in FIG. 1. On the other side of flat surface 56, flat surface 75 is the inner flat surface of cylindrical tube portion 70 as shown in FIG. 1. Cylindrical tube portion 70 has an outer diameter and an inner diameter. Tabs 60 extend inward from the inner diameter of cylindrical tube portion 70, towards the inner cylindrical tube portion 80. Gaps 65 are present where the tabs 60 are absent and are spaced equidistant from each other depending on the number of gaps 65. In some preferred the number of gaps 65 match the number of protrusions 25. In some embodiments, the number of protrusions 25 do not match the number of gaps 65. Cylindrical tube portion 70 has a width dimension 71. Gaps 65 remain gaps until flat surface 75. Tabs 60 have a width 61 that is less than the full width 71 of Cylindrical tube portion 70. The gap between the Tabs 60 and the flat surface 75 is width 62. Width 62 is at least equal to or greater than width 26 of the protrusion 25, so that when the bayonet locking mechanism is engaged to lock or unlock the coupling assembly portion 10 and 50 together, protrusion 25 can fit into the gap or width 62 between tab 60 and flat surface 75.

To engage the bayonet locking mechanism the first portion 10 is first aligned so that each protrusion 25 aligns with each gap 65 on the second portion 50. The first portion 10 and second portion 50 are then brought closer together so that the protrusions 25 pass through the gaps 65, and the cylindrical tube portion 80 passes through the center of the cylindrical tube portion 20, so that the cylindrical tube portion 80 is adjacent to the inner portion of first waveguide portion 15. The first portion 10 or second portion 50 is turned either clockwise or counterclockwise to lock portions 10 and 50 together. When portions 10 and 50 are locked together, each protrusion 25 is between a respective tab 60 and surface 75, so that the portions 10 and 50 cannot be disengaged without turning the portions 10 or 50 clockwise or counterclockwise, so that the protrusions align again with gaps 65, so that the portions 10 and 50 can be separated.

Figure 2:
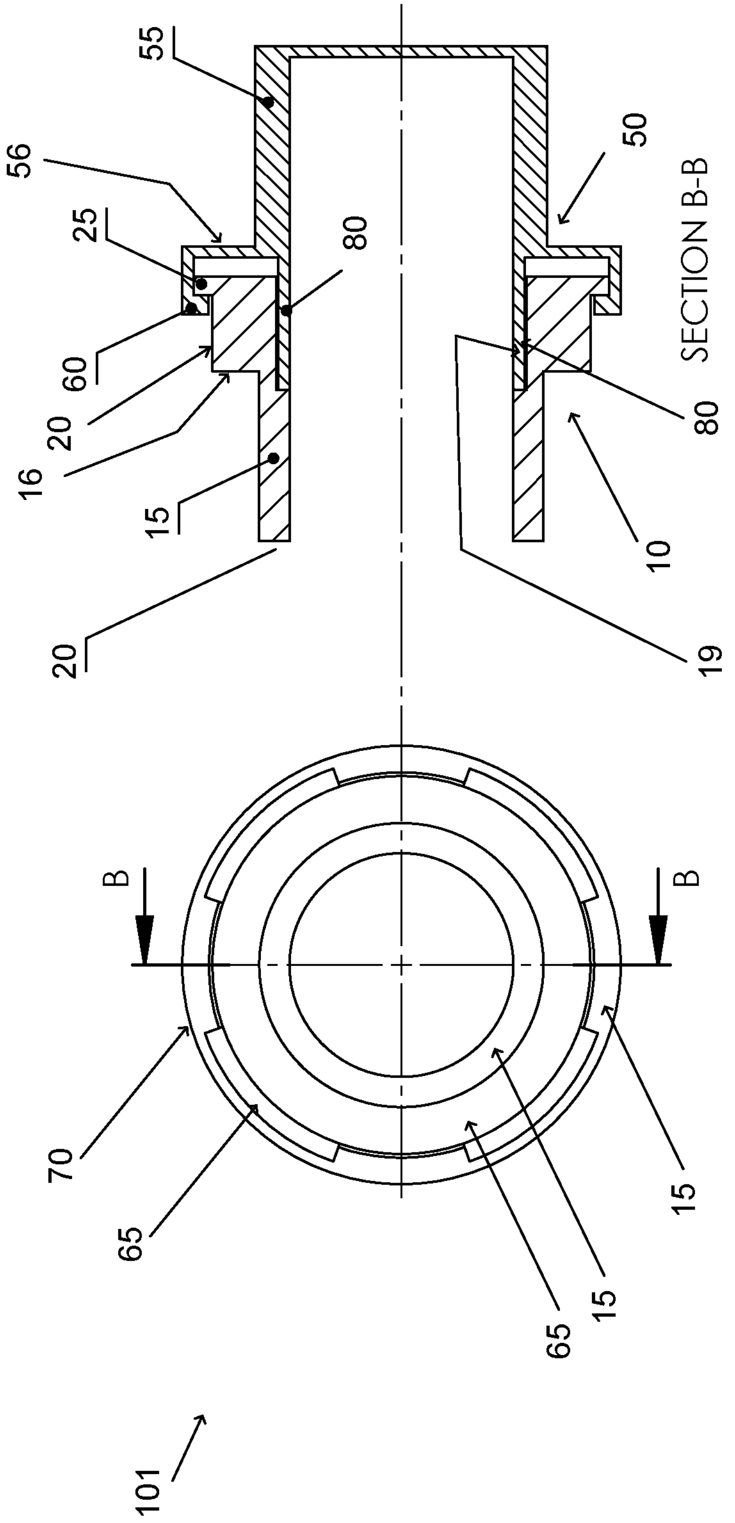
FIG. 2 is a front view and side cross sectional view of the coupling assembly as shown in FIG. 1.

FIG. 2 shows a front view and side cross sectional view of coupling assembly 101. In some embodiments, cylindrical tube portion 20 and/or the inner portion of first waveguide portion 15 have a cut out or recess portion 19 to receive a portion of cylindrical tube portion 80, so that no gaps between the inner wall of waveguide 15 and cylindrical tube portion 80 occur as shown in FIG. 2, when cylindrical tube portion 80 is fully inserted. In some embodiments, when cylindrical tube portion 80 is fully inserted into recess portion 19, recess portion 19 provides a stopping point for the insertion of tube portion 80, so that protrusions 25 can be inserted past gaps 65, and the bayonet locking mechanism is rotated to lock the portions 10 and 50 together with a frictional force. In some embodiments, due to the surface contact between protrusion 25, tab 60 and the interior portion of the tube portion 70, frictional forces are created that ensure the locking mechanism remains locked and does not rotate out of place without a user manually unlocking the mechanism by rotating the coupling assembly 101.

Figure 3:
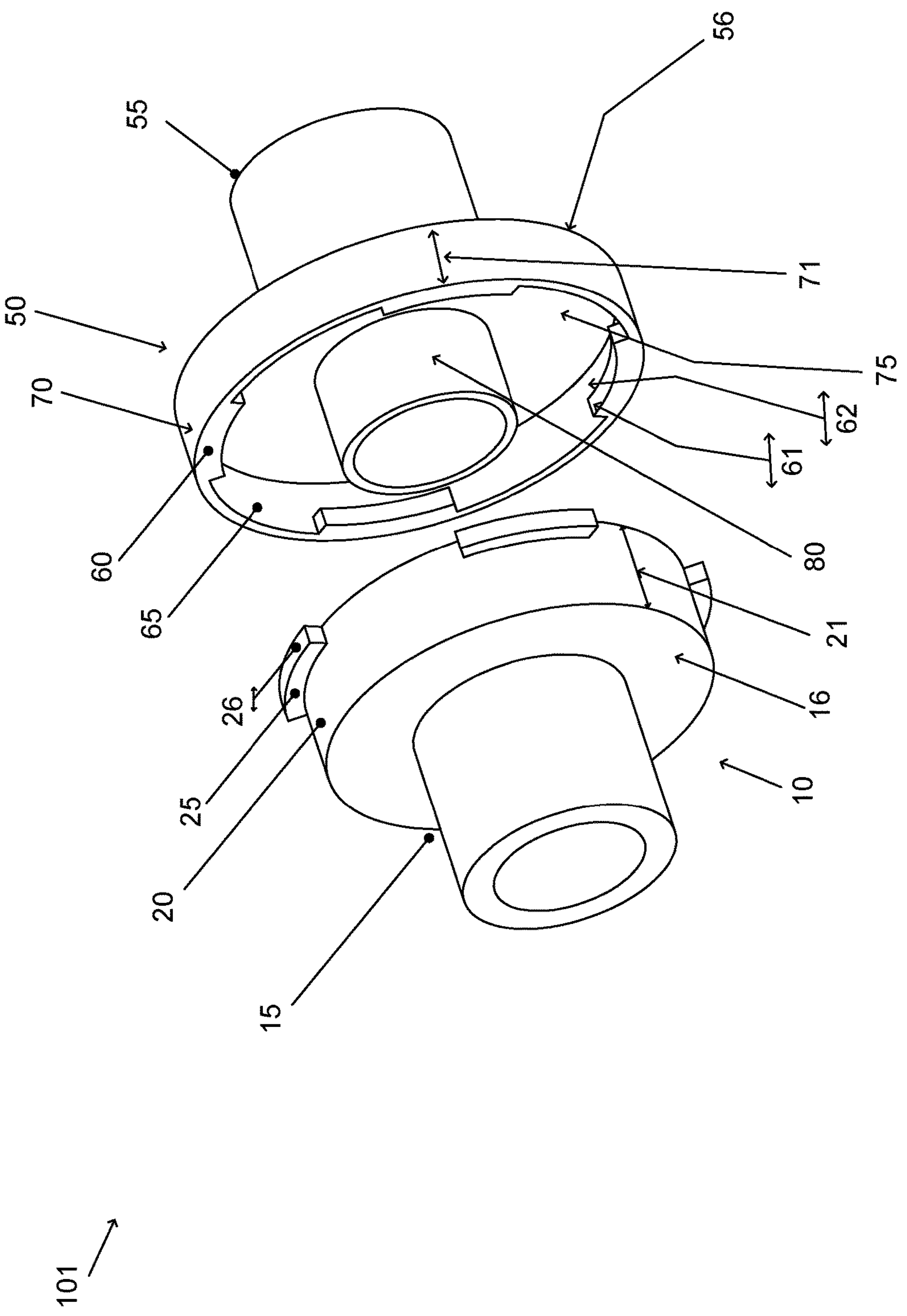
FIG. 3 is a perspective view of an embodiment of the coupling assembly having a circular waveguide with a smaller diameter than the embodiment of FIG. 1.

Referring to FIG. 3, the embodiment of coupling assembly 102 is identical to the embodiment of coupling assembly 101 shown in FIGS. 1-2, except that the waveguide 15 and tube portion 80 of embodiment 102, each have outer and inner diameters that are smaller when compared to the outer and inner diameters of the corresponding waveguide 15 and tube portion 80 of embodiment 101 as shown in FIGS. 1-2. Furthermore, the areas of flat surface 16 and 75 is greater in embodiment 102 as compared to corresponding areas of embodiment 101, since the diameters of waveguide portion 15 and tube portion 80 is smaller, and since the outer diameters of the tube portions 20 and 70 remain the same as in embodiment 101.

Figure 4:
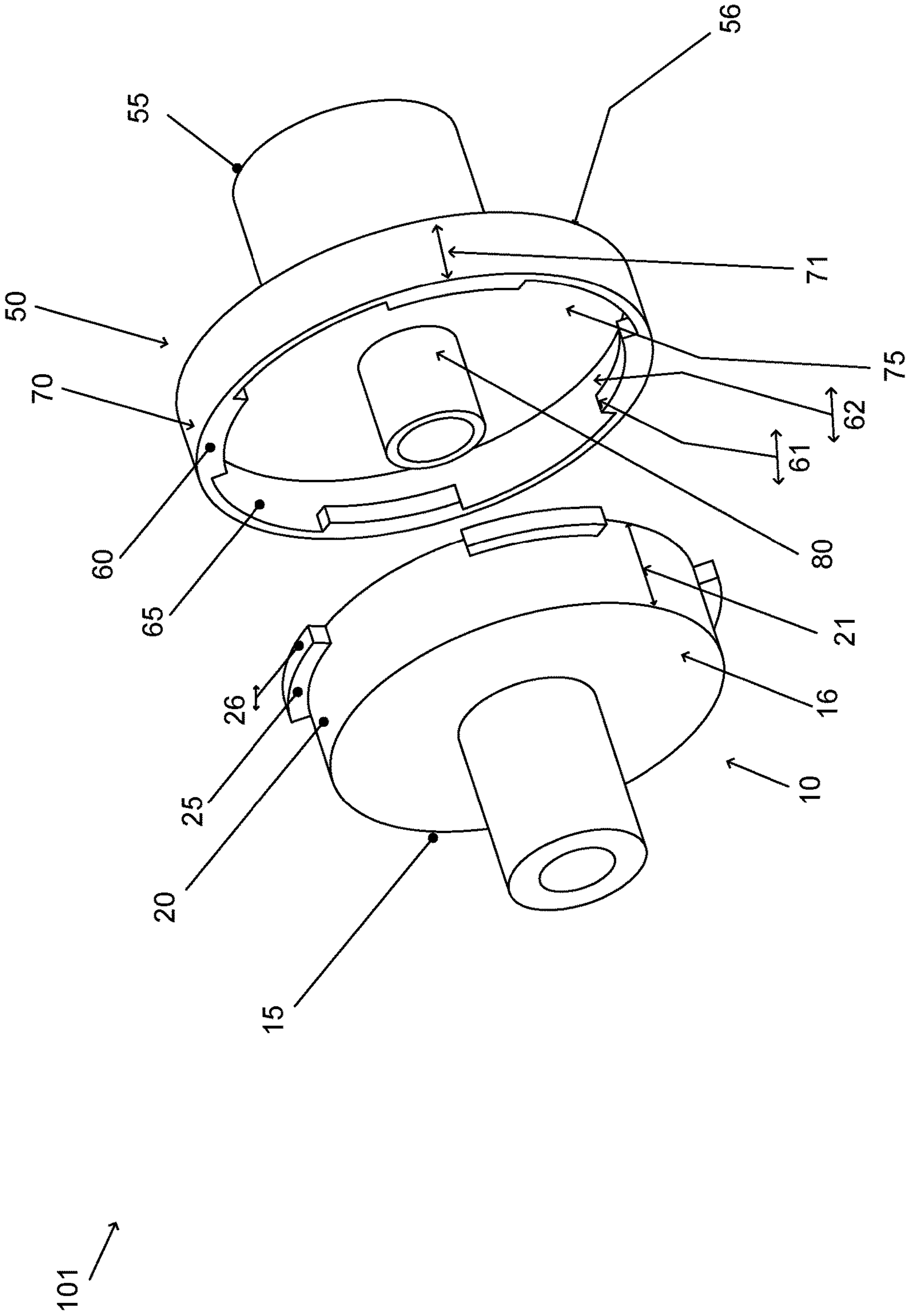
FIG. 4 is a perspective view of an embodiment of the coupling assembly having a circular waveguide with a smaller diameter than the embodiment of FIG. 3.

Referring to FIG. 4, the embodiment of coupling assembly 103 is identical to the embodiment of coupling assembly 102 shown in FIG. 3, except that the waveguide 15 and tube portion 80 of embodiment 103, each have outer and inner diameters that are smaller when compared to the outer and inner diameters of the corresponding waveguide 15 and tube portion 80 of embodiment 102 as shown. Furthermore, the areas of flat surface 16 and 75 is greater in embodiment 103 as compared to corresponding areas of embodiment 102, since the diameters of waveguide portion 15 and tube portion 80 is smaller, and since the outer diameters of the tube portions 20 and 70 remain the same as in embodiment 102 and 101.

Figure 5:
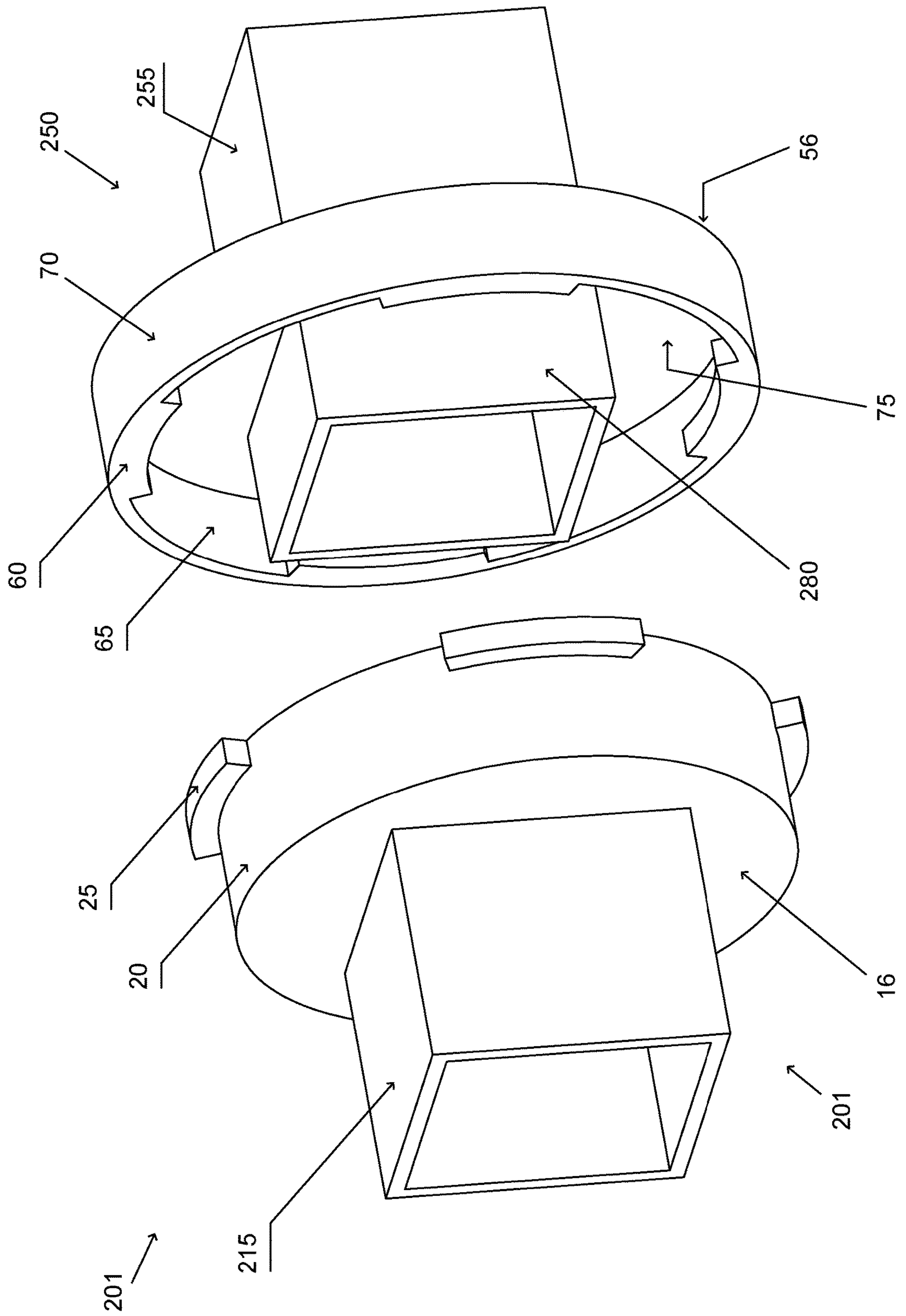
FIG. 5 is a perspective view of an embodiment of the coupling assembly having a square waveguide.

Referring to FIG. 5 an embodiment of a coupling assembly 201 having a non-circular waveguide is shown. In particular coupling assembly 201 has a first portion 210 that can be connected to a second portion 250. Coupling assembly 201 is identical to coupling assembly 101 as shown in FIGS. 1-2, except that first wave guide portion 215, inner guide portion 280 and second waveguide portion 255 are square shaped, and not circular.

Figure 6:
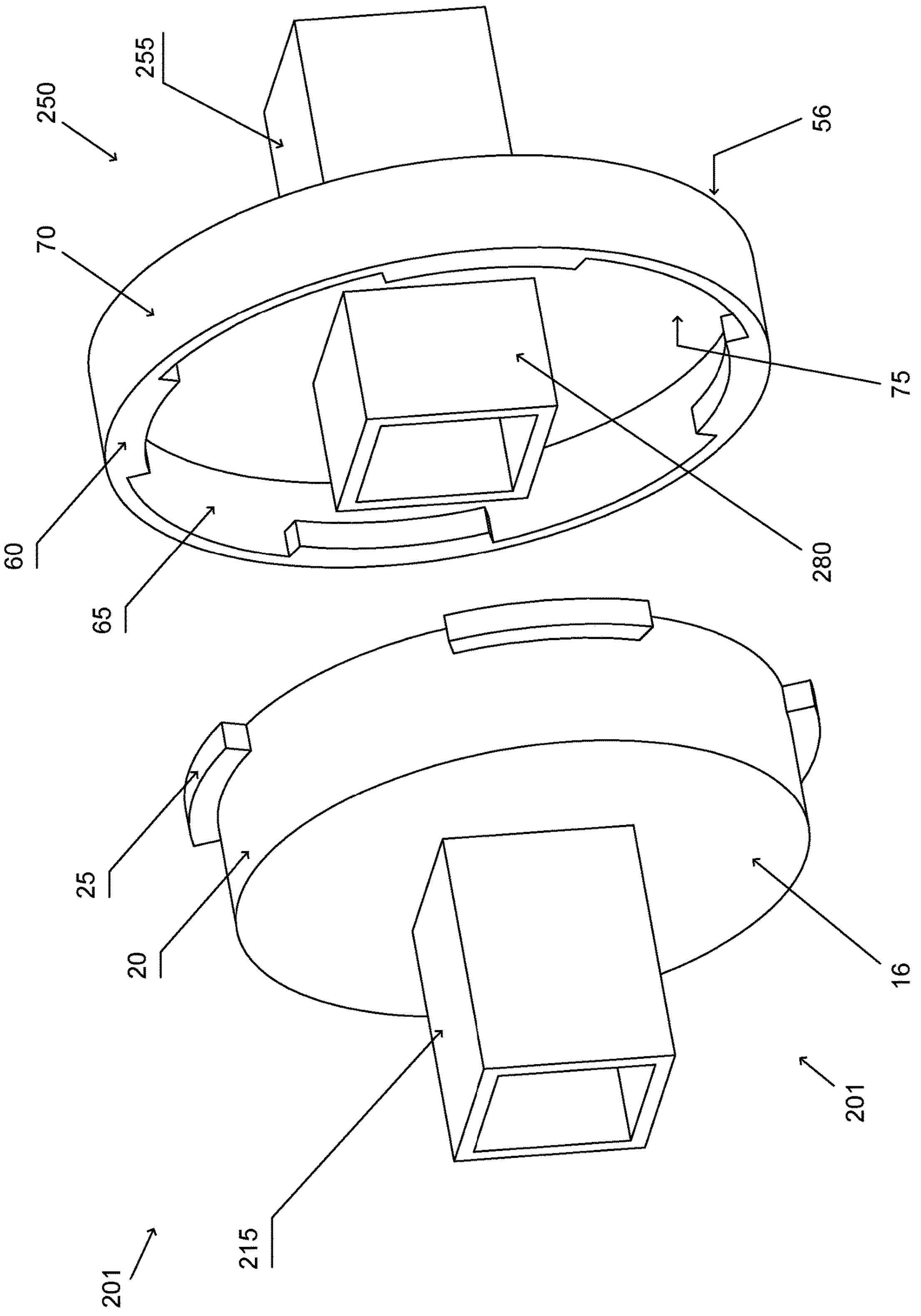
FIG. 6 is a perspective view of an embodiment of the coupling assembly having a square waveguide with a smaller perimeter than the embodiment of FIG. 5.

Referring to FIG. 6 an embodiment of a coupling assembly 202 having a non-circular waveguide is shown. Assembly 202 is identical to assembly 201, except that first waveguide 215, inner guide portion 280, and second waveguide portion 255 has a smaller square perimeter than assembly 201 of FIG. 5.

Assemblies 201 and 202 of FIGS. 5 and 6 can be joined together in same manner as described above with regards to assemblies 101, 102 and 103 of FIGS. 1-4.

While coupling assemblies 101, 102, and 103 have circular waveguides, and coupling assemblies 201 and 202 have square waveguides, other waveguide shapes such as triangular, oblong and elliptical, or other waveguide shapes can be used along with the coupling assembly of the present disclosure.

FIGS. 7A-7F, 8A-8F, 9A-9F, 10A-10F, 11A-11F, and 12A-12F as described below, refer to the embodiments 101, 102, and 103 as described above, and further describe additional information and alterations to the above embodiments such as but not limited to the use of spacers, casings, integrated spacers, and the use of different sized or varying inner diameters.

Figures 7A, 7B, 7C:
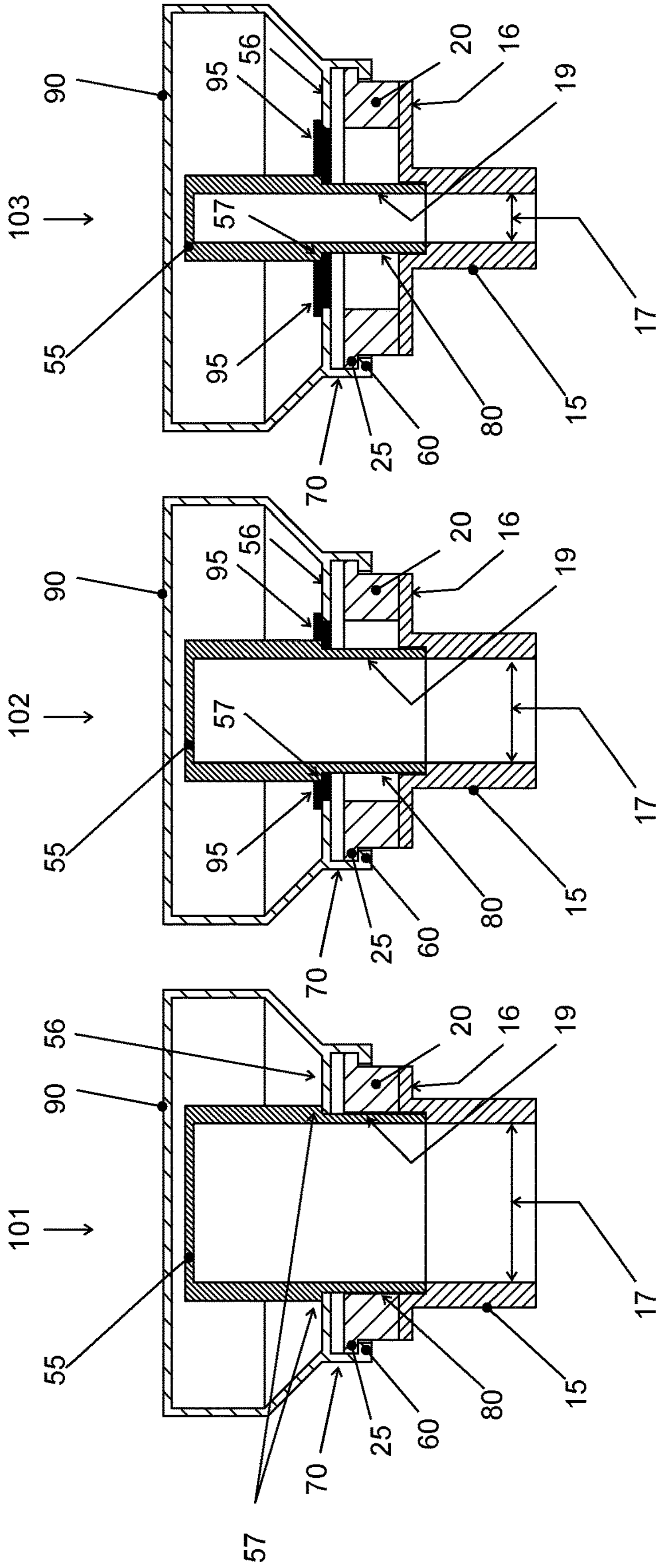
FIG. 7A is a top cross-sectional view of an embodiment of a coupling assembly having a circular waveguide.
FIG. 7B is a top cross-sectional view of an embodiment of a coupling assembly having a circular waveguide with a smaller diameter than the embodiment of FIG. 7A with a spacer.
FIG. 7C is a top cross-sectional view of an embodiment of a coupling assembly having a circular waveguide with a smaller diameter than the embodiment of FIG. 7B with a larger spacer.

Referring to FIG. 7A, a top cross-sectional view of an embodiment of coupling assembly 101 is shown. In some embodiments, cylindrical portion 70 is connected to an outer casing 90. Outer casing 90, in some embodiments, can be a housing for a device such as a radio. Second waveguide portion 55 and inner tube portion 80 can be a unitary single piece that are connected to cylindrical portion 70 through a central circular hole in portion 70. At the boundary between the outer diameter of second waveguide 55 and the outer diameter of tube portion 80, is protrusion 57 that is at the diameter of the second waveguide 55. Protrusion 57 comes into contact with flat surface 56, so as to prevent second waveguide portion 55 from passing through the central hole in portion 70 and keeps waveguide portion 55 within casing 90 as shown. The central hole in cylindrical portion 70 is at the same diameter size as the outer diameter of inner tube portion 80. Coupling assembly 101 as shown in FIG. 7A, has a first waveguide portion 15 with an inner diameter 17, that is the same as the inner diameter of inner tube portion 80 and second waveguide portion 55. Recess 19 has a diameter that is equal to the outer diameter of inner tube portion 80 and can receive a portion of tube 80.

Referring to FIG. 7B, a top cross-sectional view of an embodiment of coupling assembly 102 is shown. In some embodiments, cylindrical portion 70 is connected to an outer casing 90. Outer casing 90, in some embodiments, can be a housing for a device such as a radio. Second waveguide portion 55 and inner tube portion 80 can be a unitary single piece that are connected to cylindrical portion 70 through a central circular hole in portion 70. As shown in FIG. 7B, the inner diameter of the first wave guide 15, inner tube portion 80 and second waveguide portion 55 have the same inner diameter 17. The inner diameter 17 of coupling assembly 102 is smaller than the inner diameter 17 of coupling assembly 101. At the boundary between the greater outer diameter of second waveguide 55 and the lesser outer diameter of tube portion 80, is protrusion 57 that is at the diameter of the second waveguide 55. The central hole in cylindrical portion 70 of coupling assembly 102 as shown in FIG. 7B is the same size as the central hole portion 70 as shown in the coupling assembly 101 as shown in FIG. 7A. Due to the difference in diameters of the hole in cylindrical portion 70 in coupling 102 and the outer diameter of tube portion 80 in coupling assembly 102, a spacer 95 must be placed between the central hole in portion 70 and the outer portion of tube 80, to keep tube 80 in place and keeps waveguide portion 55 within casing 90 as shown. Protrusion 57 comes into contact with spacer 95, and spacer 95 comes into contact with flat surface 56. When spacer 95 is placed between the hole and tube 80, spacer 95 bridges the gap between the hole and the diameter of tube 80, while a portion of spacer 95 fits around second waveguide 55 and contacts surface 56. Recess 19 of coupling assembly 102 has a diameter that is equal to the outer diameter of inner tube portion 80 of coupling assembly 102 so that the recess 19 can receive a portion of inner tube 80.

Referring to FIG. 7C, a top cross-sectional view of an embodiment of coupling assembly 103 is shown. In some embodiments, cylindrical portion 70 is connected to an outer casing 90. Outer casing 90, in some embodiments, can be a housing for a device such as a radio. Second waveguide portion 55 and inner tube portion 80 can be a unitary single piece that are connected to cylindrical portion 70 through a central hole in portion 70. Coupling assembly 103 as shown in FIG. 7C, as a first waveguide portion 15 with an inner diameter 17, that is the same as the inner diameter of inner tube portion 80 and second waveguide portion 55. The inner diameter 17 of coupling assembly 103 is smaller than the inner diameter 17 of coupling assembly 102. At the boundary between the outer diameter of second waveguide 55 and the outer diameter of tube portion 80, is protrusion 57 that is at the diameter of the second waveguide 55 of coupling assembly 103. The central hole in cylindrical portion 70 of coupling assembly 103 as shown in FIG. 7C is the same size as the central hole in portion 70 of coupling assembly 101 as shown in FIG. 7A. Due to the difference in diameters of the central hole in cylindrical portion 70 in coupling assembly 103 and the outer diameter of tube portion 80 in coupling assembly 103, a spacer 95 must be placed between the central hole in portion 70 and the outer portion of tube 80, to keep tube 80 in place. When spacer 95 is placed between the hole and tube 80, spacer 95 bridges the gap between the hole and the diameter of tube 80, while a portion of spacer 95 fits around second waveguide 55 and contacts surface 56. Protrusion 57 comes into contact with spacer 95, and spacer 95 comes into contact with flat surface 56. Spacer 95 of coupling assembly 103 is greater in size than the spacer 95 of coupling assembly 102. Recess 19 of coupling assembly 103 has a diameter that is equal to the outer diameter of inner tube portion 80 of coupling assembly 103 so that the recess 19 can receive a portion of inner tube 80.

Figure 7D:
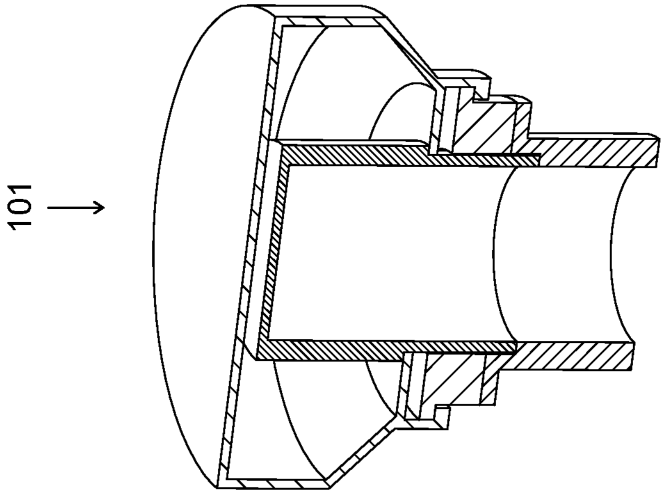
FIG. 7D is a perspective view of the embodiment of FIG. 7A.

Referring to FIG. 7D, a perspective view of the embodiment 101 of FIG. 7A is shown.

Figure 7E:
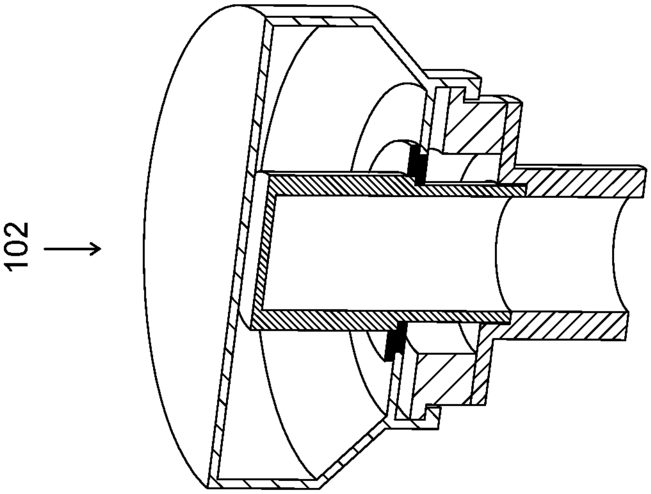
FIG. 7E is a perspective view of the embodiment of FIG. 7B.

Referring to FIG. 7E, a perspective view of the embodiment 102 of FIG. 7B is shown.

Figure 7F:
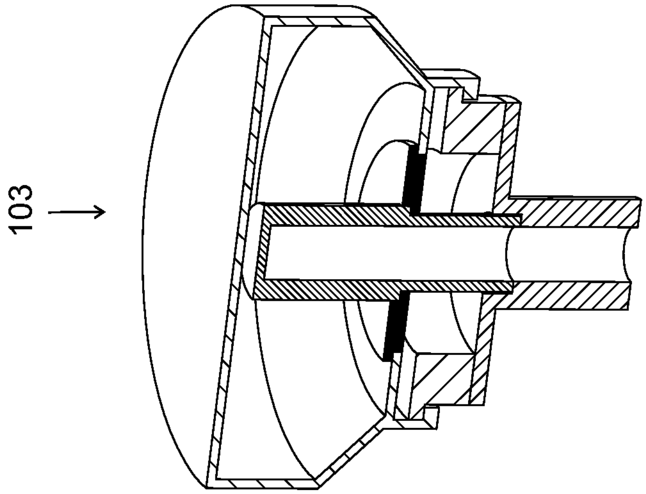
FIG. 7F is a perspective view of the embodiment of FIG. 7C.

Referring to FIG. 7F, a perspective view of the embodiment 103 of FIG. 7C is shown.

Figures 8A, 8B, 8C:
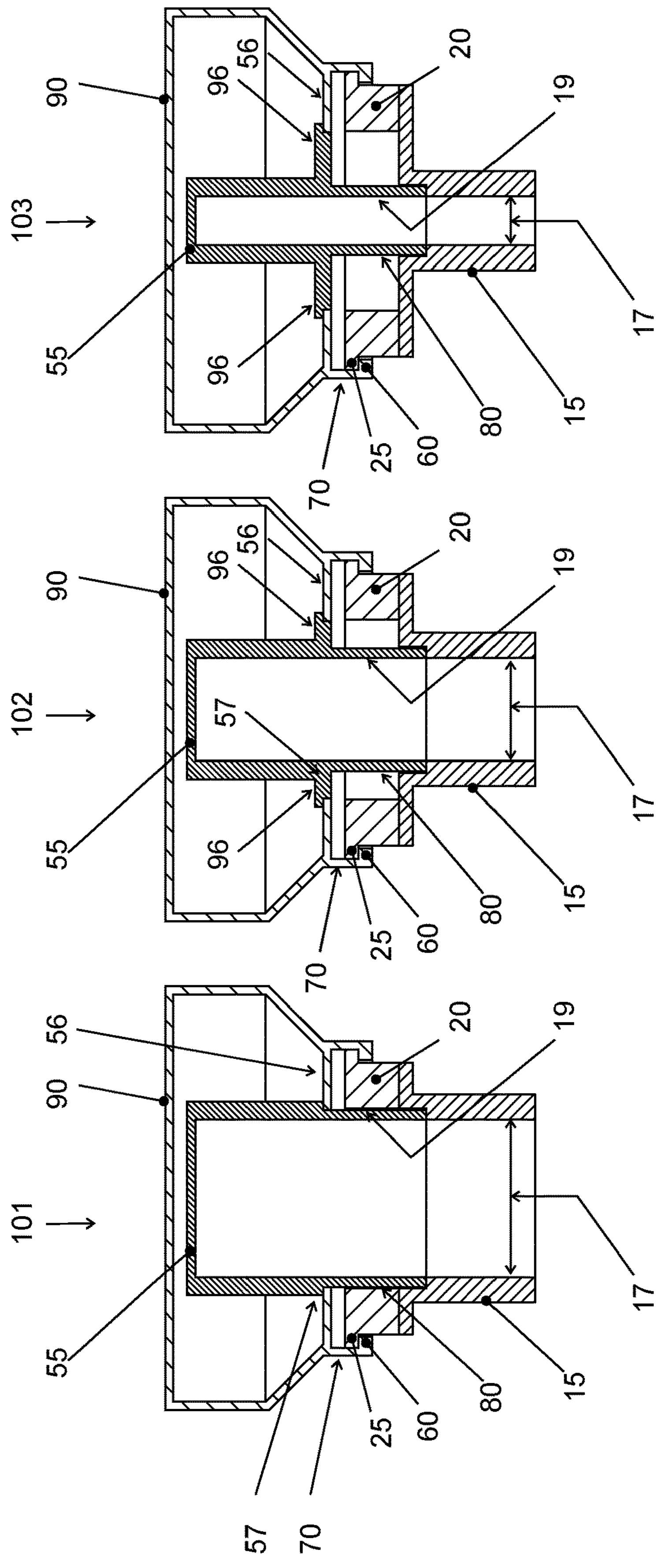
FIG. 8A is a top cross-sectional view of an embodiment of a coupling assembly having a circular waveguide.
FIG. 8B is a top cross-sectional view of an embodiment of a coupling assembly having a circular waveguide with a smaller diameter than the embodiment of FIG. 8A with an integrated spacer.
FIG. 8C is a top cross-sectional view of an embodiment of a coupling assembly having a circular waveguide with a smaller diameter than the embodiment of FIG. 8B with a larger integrated spacer.

Referring to FIG. 8A, a top cross-sectional view of an embodiment of coupling assembly 101 is shown, that is identical to the embodiment of coupling assembly 101 as shown in FIG. 7A and described above.

Referring to FIG. 8B, a top cross-sectional view of an embodiment of coupling assembly 102 is shown. In some embodiments, cylindrical portion 70 is connected to an outer casing 90. Outer casing 90, in some embodiments, can be a housing for a device such as a radio. As shown in FIG. 8B, the inner diameter of the first wave guide 15, inner tube portion 80 and second waveguide portion 55 have the same inner diameter 17. The inner diameter 17 of coupling assembly 102 is smaller than the inner diameter 17 of coupling assembly 101 of FIG. 8A. At the boundary between the greater outer diameter of second waveguide 55 and the lesser outer diameter of tube portion 80, is an integrated spacer 96, or referred to as protrusion 96. Protrusion 57 of FIG. 8A is not present in the embodiments shown in FIGS. 8B and 8C. The central hole in cylindrical portion 70 of coupling assembly 102 as shown in FIG. 8B is the same size as the central hole portion 70 as shown in the coupling assembly 101 as shown in FIG. 8A. Due to the difference in diameters of the hole in cylindrical portion 70 in coupling 102 and the outer diameter of tube portion 80 in coupling assembly 102, protrusion 96 increases the diameter, to keep tube 80 in place and keeps waveguide portion 55 within casing 90 as shown. Protrusion 96 comes into contact with flat surface 56. Protrusion 96 is part of a single unitary piece that includes inner tube 80, and second waveguide 55. Recess 19 of coupling assembly 102 has a diameter that is equal to the outer diameter of inner tube portion 80 of coupling assembly 102 so that the recess 19 can receive a portion of inner tube 80.

Referring to FIG. 8C, a top cross-sectional view of an embodiment of coupling assembly 103 is shown. In some embodiments, cylindrical portion 70 is connected to an outer casing 90. Outer casing 90, in some embodiments, can be a housing for a device such as a radio. Coupling assembly 103 as shown in FIG. 8C, has a first waveguide portion 15 with an inner diameter 17, that is the same as the inner diameter of inner tube portion 80 and second waveguide portion 55. The inner diameter 17 of coupling assembly 103 as shown in FIG. 8C is smaller than the inner diameter 17 of coupling assembly 102 as shown in FIG. 8B. At the boundary between the greater outer diameter of second waveguide 55 and the lesser outer diameter of tube portion 80, is protrusion 96. The central hole in cylindrical portion 70 of coupling assembly 103 as shown in FIG. 8C is the same size as the coupling assembly 101 as shown in FIG. 8A. Due to the difference in diameters of the hole in cylindrical portion 70 in coupling 103 and the outer diameter of tube portion 80 in coupling assembly 103, protrusion 96 increases the diameter of tube 80, to keep tube 80 in place and keeps waveguide portion 55 within casing 90 as shown. Protrusion 96 comes into contact with flat surface 56. Protrusion 96 is part of a single unitary piece that includes inner tube 80, and second waveguide 55. Protrusion 96 of coupling assembly 103 is greater in size than the Protrusion 96 of coupling assembly 102. Recess 19 of coupling assembly 103 has a diameter that is equal to the outer diameter of inner tube portion 80 of coupling assembly 103 so that the recess 19 can receive a portion of inner tube 80.

Figure 8F:
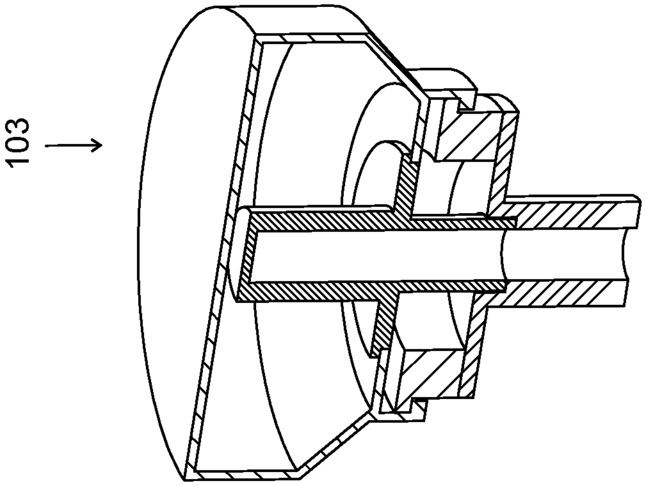
FIG. 8F is a perspective view of the embodiment of FIG. 8C.
Figure 8E:
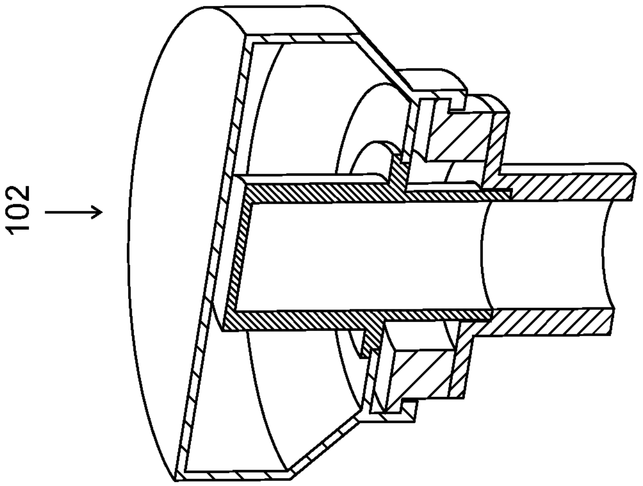
FIG. 8E is a perspective view of the embodiment of FIG. 8B.
Figure 8D:
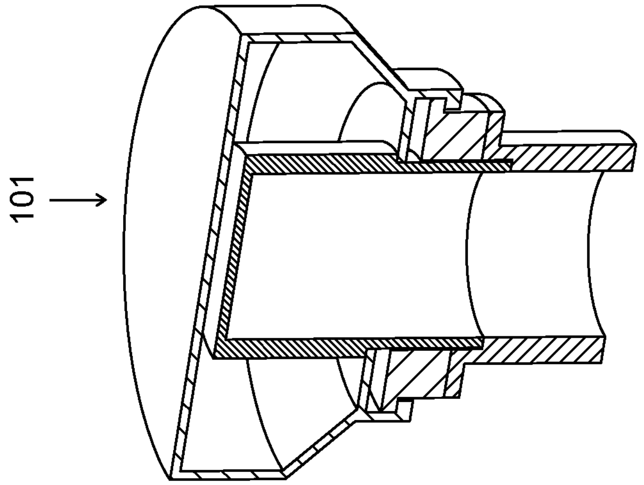
FIG. 8D is a perspective view of the embodiment of FIG. 8A.

Referring to FIG. 8D, a perspective view of the embodiment 101 of FIG. 8A is shown.

Referring to FIG. 8E, a perspective view of the embodiment 102 of FIG. 8B is shown.

Referring to FIG. 8F, a perspective view of the embodiment 103 of FIG. 8C is shown.

Figure 9C:
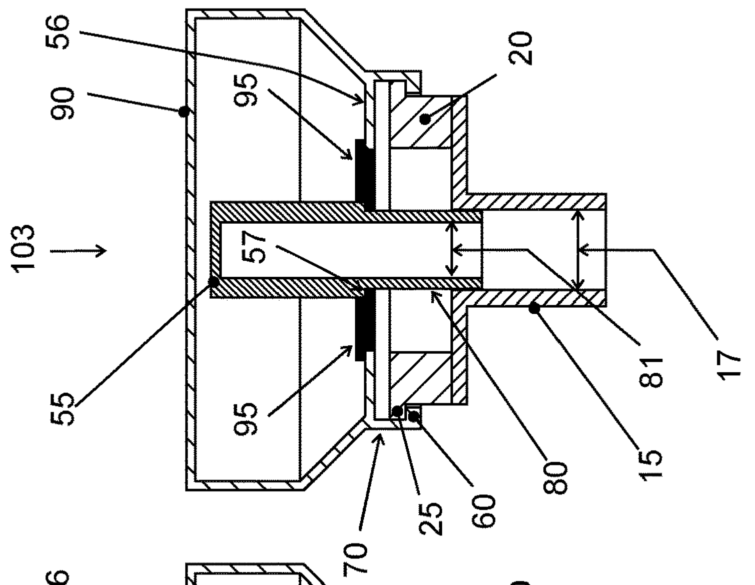
FIG. 9C is a top cross-sectional view of an embodiment of a coupling assembly having a circular waveguide with a smaller inner diameter than the embodiment of FIG. 9B with different inner diameters and a larger spacer.
Figure 9B:
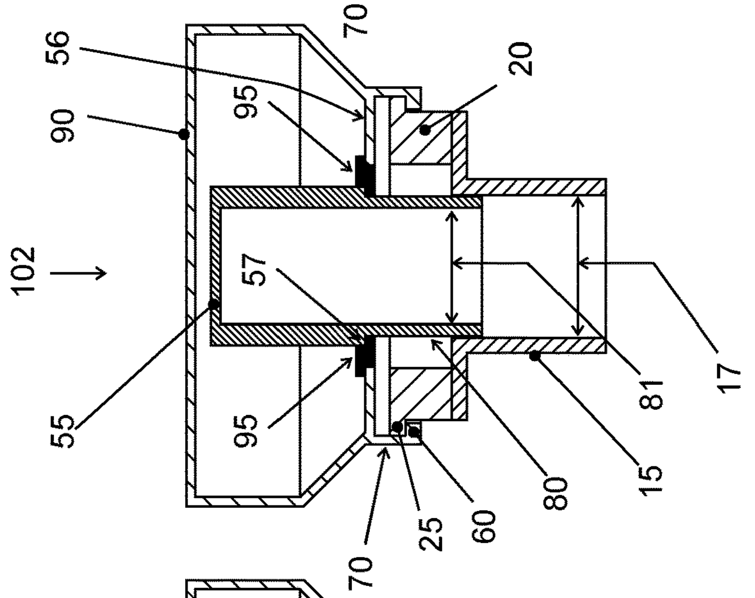
FIG. 9B is a top cross-sectional view of an embodiment of a coupling assembly having a circular waveguide with a smaller inner diameter than the embodiment of FIG. 9A with different inner diameters and a spacer.
Figure 9A:
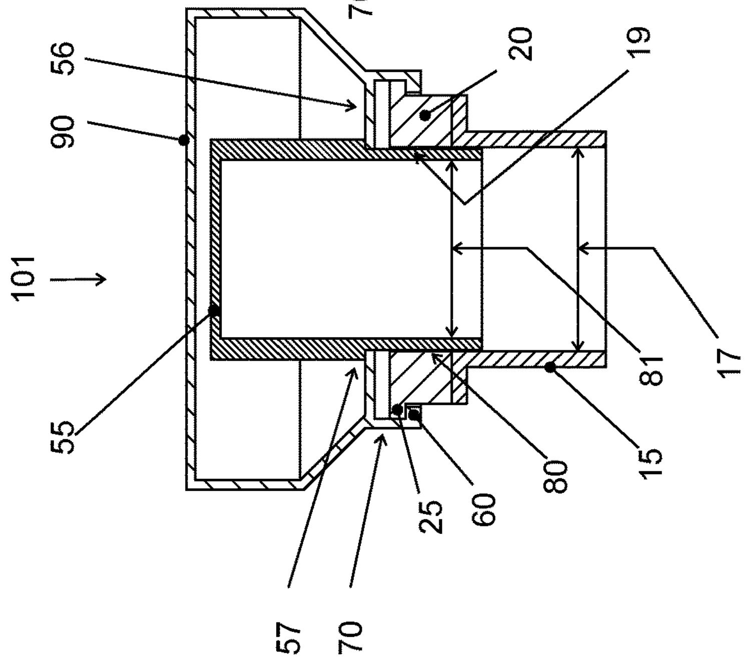
FIG. 9A is a top cross-sectional view of an embodiment of a coupling assembly having a circular waveguide, with different inner diameters.

Referring to FIG. 9A, a top cross-sectional view of an embodiment of coupling assembly 101 is shown. In some embodiments, cylindrical portion 70 is connected to an outer casing 90. Outer casing 90, in some embodiments, can be a housing for a device such as a radio. Second waveguide portion 55 and inner tube portion 80 can be a unitary single piece that are connected to cylindrical portion 70 through a central circular hole in portion 70. At the boundary between the outer diameter of second waveguide 55 and the outer diameter of tube portion 80, is protrusion 57 that is at the diameter of the second waveguide 55. Protrusion 57 comes into contact with flat surface 56, so as to prevent second waveguide portion 55 from passing through the central hole in portion 70 and keeps waveguide portion 55 within casing 90 as shown. The central hole in cylindrical portion 70 is at the same diameter size as the outer diameter of inner tube portion 80. Coupling assembly 101 as shown in FIG. 9A, has a first waveguide portion 15 with an inner diameter 17, that is larger than the inner diameter 81 of inner tube portion 80. The inner diameter 81 of tube portion 80 is the same as the inner diameter of the second waveguide portion 55. The embodiment of coupling assembly 101 as shown in FIG. 9A does not have a recess 19 to receive a portion of tube 80. In some embodiments, the outer diameter of tube portion 80 is the same as the inner diameter 17 of first waveguide portion 15. The coupling assembly 101 as shown in FIG. 9A therefore has two varying inner diameters 17 and 81. In some embodiments, a varying inner diameter also referred to as an offset diameter can be useful for specific purposes such as impedance matching, and waveguide mode conversion and can be changed as needed for a particular antenna design.

Referring to FIG. 9B, a top cross-sectional view of an embodiment of coupling assembly 102 is shown. In some embodiments, cylindrical portion 70 is connected to an outer casing 90. Outer casing 90, in some embodiments, can be a housing for a device such as a radio. Second waveguide portion 55 and inner tube portion 80 can be a unitary single piece that are connected to cylindrical portion 70 through a central hole in portion 70. As shown in FIG. 9B, the inner diameter 17 of the first wave guide 15, is larger than the inner diameter 81 of tube portion 80. Tube portion 80 and second waveguide portion 55 have the same inner diameter 81. The inner diameter 17 of coupling assembly 102 as shown in FIG. 9B is smaller than the inner diameter 17 of coupling assembly 101 as shown in FIG. 9A. At the boundary between the outer diameter of second waveguide 55 and the outer diameter of tube portion 80, is protrusion 57 that is at the diameter of the second waveguide 55. The central hole in cylindrical portion 70 of coupling assembly 102 as shown in FIG. 9B is the same size as the central hole portion 70 as shown in the coupling assembly 101 as shown in FIG. 9A. Due to the difference in diameters of the hole in cylindrical portion 70 in coupling 102 and the outer diameter of tube portion 80 in coupling assembly 102, a spacer 95 must be placed between the central hole in portion 70 and the outer portion of tube 80, to keep tube 80 in place and keeps waveguide portion 55 within casing 90 as shown. Protrusion 57 comes into contact with spacer 95, and spacer 95 comes into contact with flat surface 56. When spacer 95 is placed between the hole and tube 80, spacer 95 bridges the gap between the hole and the diameter of tube 80, while a portion of spacer 95 fits around second waveguide 55 and contacts surface 56. The embodiment of coupling assembly 102 as shown in FIG. 9B does not have a recess 19 to receive a portion of tube 80. In some embodiments, the outer diameter of tube portion 80 is the same as the inner diameter 17 of first waveguide portion 15. The coupling assembly 102 as shown in FIG. 9B therefore has two varying inner diameters 17 and 81 with diameter 17 being greater than diameter 81. The inner diameter 17 and inner diameter 81 of coupling assembly 102 as shown in FIG. 9B is smaller than the inner diameter 17 and inner diameter 81 of coupling assembly 101 as shown in FIG. 9A.

Referring to FIG. 9C, a top cross-sectional view of an embodiment of coupling assembly 103 is shown. In some embodiments, cylindrical portion 70 is connected to an outer casing 90. Outer casing 90, in some embodiments, can be a housing for a device such as a radio. Second waveguide portion 55 and inner tube portion 80 can be a unitary single piece that are connected to cylindrical portion 70 through a central hole in portion 70. As shown in FIG. 9C, the inner diameter 17 of the first wave guide 15, is larger than the inner diameter 81 of tube portion 80. Tube portion 80 and second waveguide portion 55 have the same inner diameter 81. The inner diameter 17 of coupling assembly 102 as shown in FIG. 9C is smaller than the inner diameter 17 of coupling assembly 101 as shown in FIG. 9B. At the boundary between the outer diameter of second waveguide 55 and the outer diameter of tube portion 80, is protrusion 57 that is at the diameter of the second waveguide 55. The central hole in cylindrical portion 70 of coupling assembly 102 as shown in FIG. 9C is the same size as the central hole portion 70 as shown in the coupling assembly 101 as shown in FIG. 9A. Due to the difference in diameters of the hole in cylindrical portion 70 in coupling assembly 103 and the outer diameter of tube portion 80 in coupling assembly 103, a spacer 95 must be placed between the central hole in portion 70 and the outer portion of tube 80, to keep tube 80 in place and keeps waveguide portion 55 within casing 90 as shown. Protrusion 57 comes into contact with spacer 95, and spacer 95 comes into contact with flat surface 56. When spacer 95 is placed between the hole and tube 80, spacer 95 bridges the gap between the hole and the diameter of tube 80, while a portion of spacer 95 fits around second waveguide 55 and contacts surface 56. The embodiment of coupling assembly 103 as shown in FIG. 9C does not have a recess 19 to receive a portion of tube 80. In some embodiments, the outer diameter of tube portion 80 is the same as the inner diameter 17 of first waveguide portion 15. The coupling assembly 103 as shown in FIG. 9C therefore has two varying inner diameters 17 and 81 with diameter 17 being greater than diameter 81. The inner diameter 17 and inner diameter 81 of coupling assembly 103 as shown in FIG. 9C is smaller than the inner diameter 17 and inner diameter 81 of coupling assembly 102 as shown in FIG. 9B. Spacer 95 of coupling assembly 103 as shown in FIG. 9C is greater in size than the spacer 95 of coupling assembly 102 as shown in FIG. 9B.

Figure 9D:
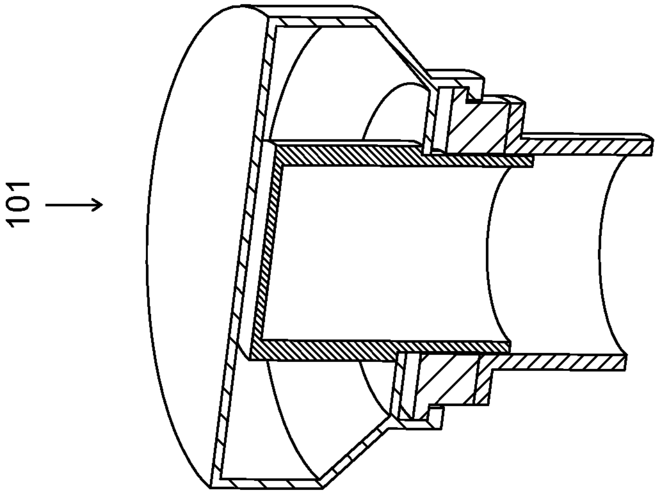
FIG. 9D is a perspective view of the embodiment of FIG. 9A.

Referring to FIG. 9D, a perspective view of the embodiment 101 of FIG. 9A is shown.

Figure 9E:
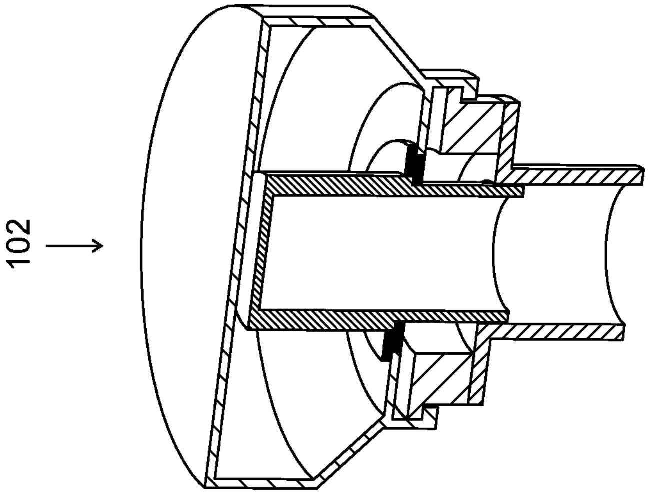
FIG. 9E is a perspective view of the embodiment of FIG. 9B.

Referring to FIG. 9E, a perspective view of the embodiment 102 of FIG. 9B is shown.

Figure 9F:
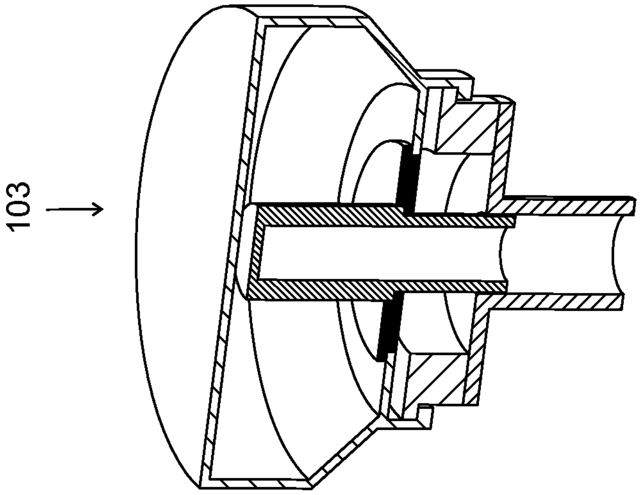
FIG. 9F is a perspective view of the embodiment of FIG. 9C.

Referring to FIG. 9F, a perspective view of the embodiment 103 of FIG. 9C is shown.

Figures 10A, 10B, 10C:
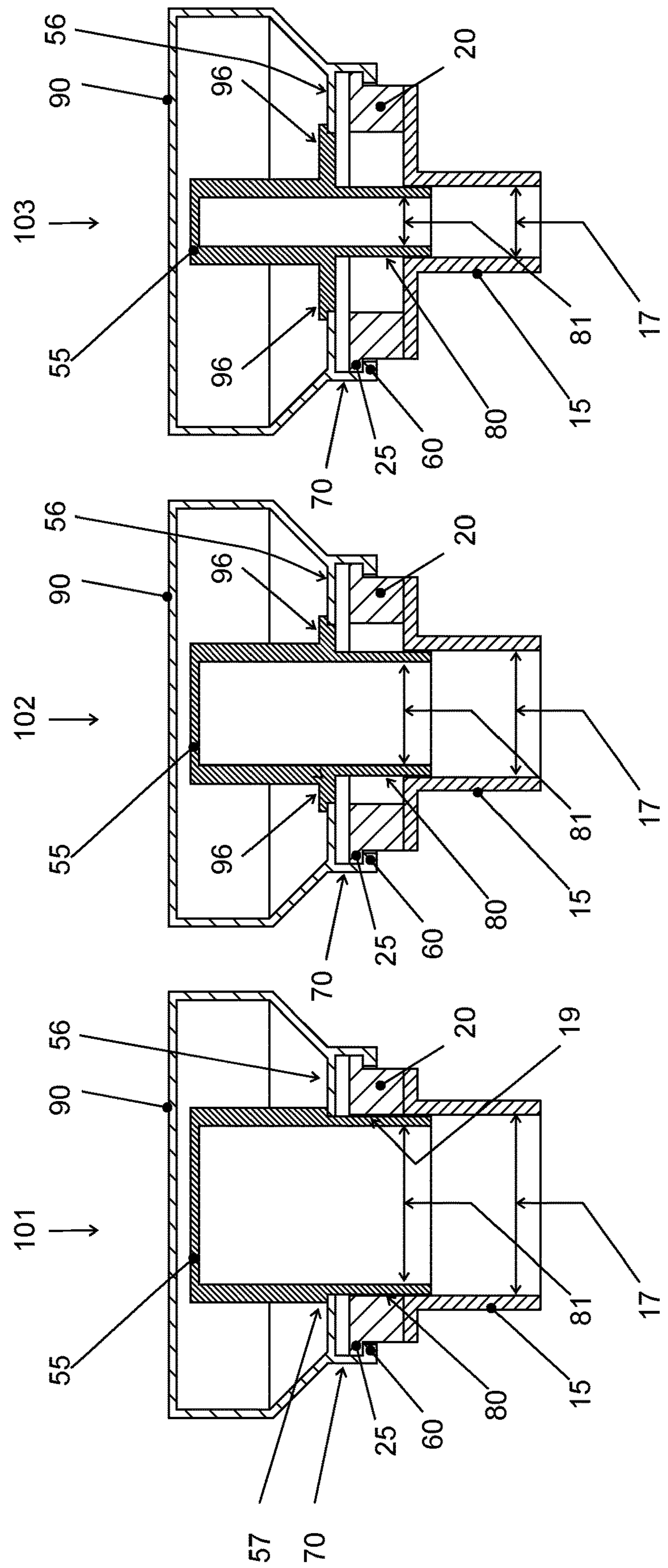
FIG. 10A is a top cross-sectional view of an embodiment of a coupling assembly having a circular waveguide, with different inner diameters.
FIG. 10B is a top cross-sectional view of an embodiment of a coupling assembly having a circular waveguide with a smaller inner diameter than the embodiment of FIG. 10A with different inner diameters and an integrated spacer.
FIG. 10C is a top cross-sectional view of an embodiment of a coupling assembly having a circular waveguide with a smaller inner diameter than the embodiment of FIG. 10B with different inner diameters and a larger integrated spacer.

Referring to FIG. 10A, a top cross-sectional view of an embodiment of coupling assembly 101 is shown, that is identical to the embodiment of coupling assembly 101 as shown in FIG. 9A and described above.

Referring to FIG. 10B, a top cross-sectional view of an embodiment of coupling assembly 102 is shown. In some embodiments, cylindrical portion 70 is connected to an outer casing 90. Outer casing 90, in some embodiments, can be a housing for a device such as a radio. The inner diameter 17 and inner diameter 81 of coupling assembly 102 as shown in FIG. 10B is smaller than the inner diameter 17 and inner diameter 81 of coupling assembly 101 as shown in FIG. 10A. At the boundary between the outer diameter of second waveguide 55 and the smaller outer diameter of tube portion 80, is protrusion 96. Protrusion 57 is not present in the embodiments shown in FIGS. 10B and 10C. The central hole in cylindrical portion 70 of coupling assembly 102 as shown in FIG. 10B is the same size as the central hole in portion 70 in the coupling assembly 101 as shown in FIG. 10A. Due to the difference in diameters of the central hole in cylindrical portion 70 in coupling assembly 102 and the outer diameter of tube portion 80 in coupling assembly 102, protrusion 96 is required to increase the diameter of tube 80, to keep tube 80 in place and keeps waveguide portion 55 within casing 90 as shown. A portion of protrusion 96 comes into contact with flat surface 56. Protrusion 96 is part of a single unitary piece that includes inner tube 80, and second waveguide 55. The embodiment of coupling assembly 102 as shown in FIG. 10B does not have a recess 19 to receive a portion of tube 80. In some embodiments, the outer diameter of tube portion 80 is the same as the inner diameter 17 of first waveguide portion 15. The coupling assembly 102 as shown in FIG. 10B has two varying inner diameters 17 and 81 with diameter 17 being greater than diameter 81.

Referring to FIG. 10C, a top cross-sectional view of an embodiment of coupling assembly 103 is shown. In some embodiments, cylindrical portion 70 is connected to an outer casing 90. Outer casing 90, in some embodiments, can be a housing for a device such as a radio. The inner diameter 17 and inner diameter 81 of coupling assembly 103 as shown in FIG. 10C is smaller than the inner diameter 17 and inner diameter 81 of coupling assembly 101 as shown in FIG. 10B. At the boundary between the outer diameter of second waveguide 55 and the smaller outer diameter of tube portion 80, is protrusion 96. The central hole in cylindrical portion 70 of coupling assembly 103 as shown in FIG. 10C is the same size as the central hole in portion 70 as shown in the coupling assembly 101 as shown in FIG. 10A. Due to the difference in diameters of the central hole in cylindrical portion 70 in coupling 103 and the outer diameter of tube portion 80 in coupling assembly 103, protrusion 96 is required to increase the diameter of tube 80, to keep tube 80 in place and keeps waveguide portion 55 within casing 90 as shown. A portion of protrusion 96 comes into contact with flat surface 56. Protrusion 96 is part of a single unitary piece that includes inner tube 80, and second waveguide 55. The embodiment of coupling assembly 103 as shown in FIG. 10C does not have a recess 19 to receive a portion of tube 80. In some embodiments, the outer diameter of tube portion 80 is the same as the inner diameter 17 of first waveguide portion 15. The coupling assembly 103 as shown in FIG. 10C therefore has two varying inner diameters 17 and 81, with diameter 17 being greater than diameter 81.

Figure 10D:
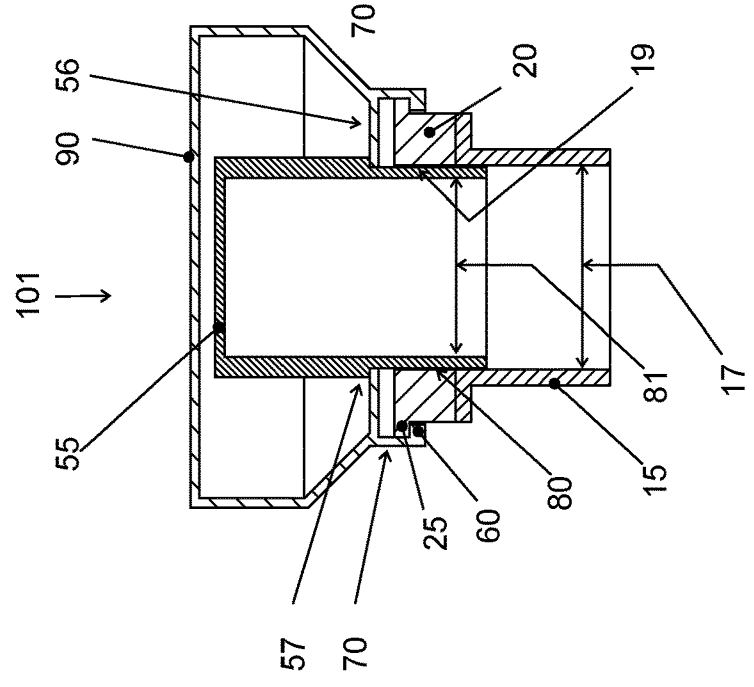
FIG. 10D is a perspective view of the embodiment of FIG. 10A.

Referring to FIG. 10D, a perspective view of the embodiment 101 of FIG. 10A is shown.

Figure 10E:
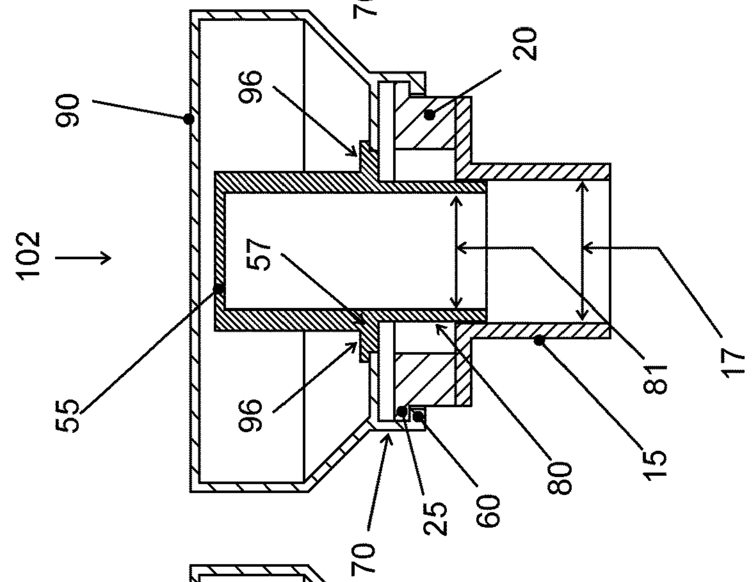
FIG. 10E is a perspective view of the embodiment of FIG. 10B.

Referring to FIG. 10E, a perspective view of the embodiment 102 of FIG. 10B is shown.

Figure 10F:
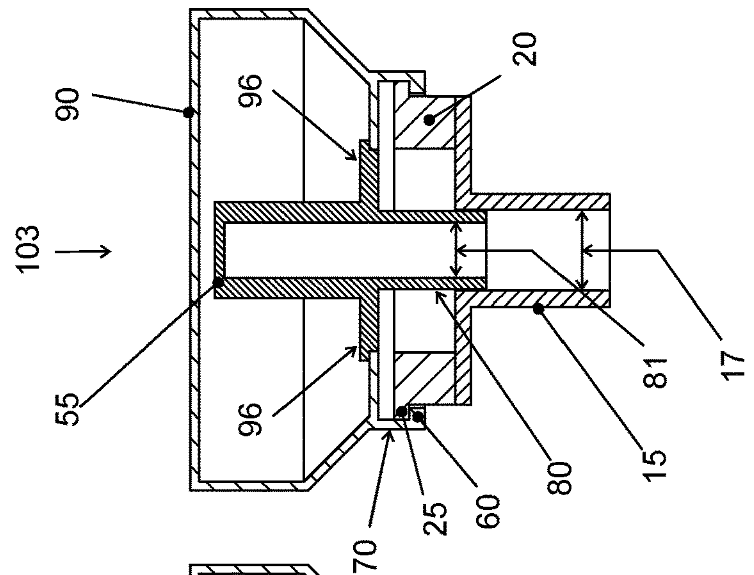
FIG. 10F is a perspective view of the embodiment of FIG. 10C.

Referring to FIG. 10F, a perspective view of the embodiment 103 of FIG. 10C is shown.

Figures 11A, 11B, 11C:
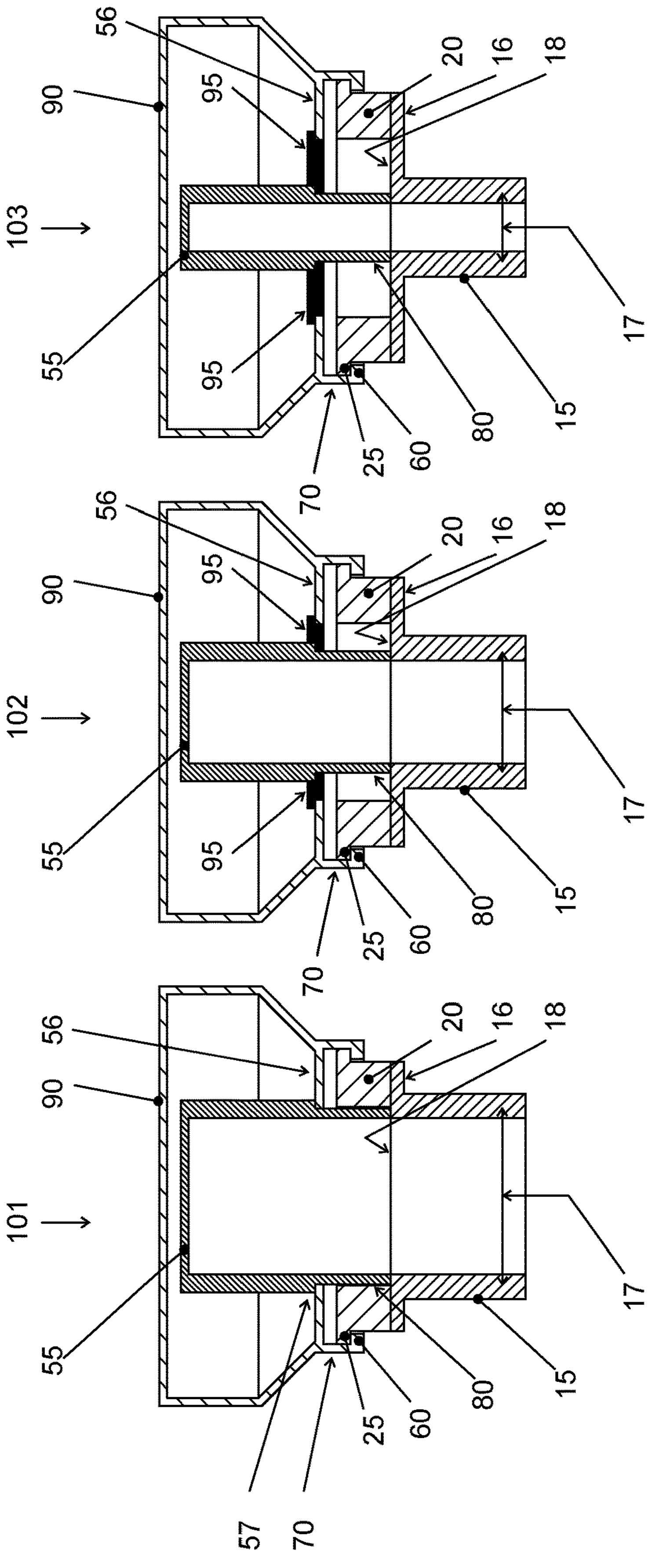
FIG. 11A is a top cross-sectional view of an embodiment of a touch contact coupling assembly having a circular waveguide.
FIG. 11B is a top cross-sectional view of an embodiment of a touch contact coupling assembly having a circular waveguide with a smaller diameter than the embodiment of FIG. 11A with a spacer.
FIG. 11C is a top cross-sectional view of an embodiment of a touch contact coupling assembly having a circular waveguide with a smaller diameter than the embodiment of FIG. 11B with a larger spacer.

Referring to FIG. 11A, a coupling assembly 101 is shown with a touch contact type connection. The coupling assembly 101 as shown in FIG. 11A is identical to the coupling assembly 101 as shown FIG. 7A, except that no insert portion or recess 19 is present. Furthermore, a bottom flat surface of the inner portion 80, contacts the flat inner surface 18 of waveguide 15 as shown.

Referring to FIG. 11B, a coupling assembly 102 is shown with a touch contact type connection. Coupling assembly 102 is identical to coupling assembly 101, as shown in FIG. 11A, except the that waveguide 55, inner portion 80, and waveguide 15 have a smaller size or diameter. As the cylindrical locking portions 70 and 20 are the same size as in the embodiment of coupling assembly 101, a spacer 95 must be used to bridge the distance between the hole in surface 56 and the diameter of waveguide 55 as described above.

Referring to FIG. 11C, a coupling assembly 103 is shown with a touch contact type connection. Coupling assembly 103 is identical to coupling assembly 102 as shown in FIG. 11B, except the that waveguide 55, inner portion 80, and waveguide 15 have a smaller size or diameter. As the cylindrical locking portions 70 and 20 are the same size as in the embodiment of coupling assembly 101, a larger spacer 95 must be used to bridge the distance as described above.

Figure 11D:
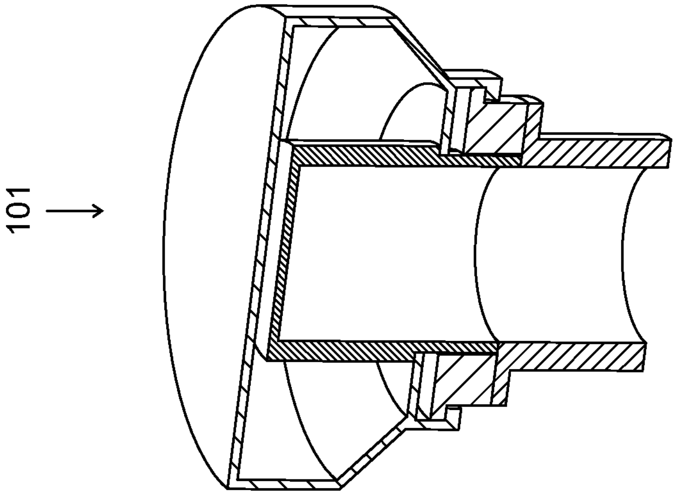
FIG. 11D is a perspective view of the embodiment of FIG. 11A.

Referring to FIG. 11D, a perspective view of the embodiment 101 of FIG. 11A is shown.

Figure 11E:
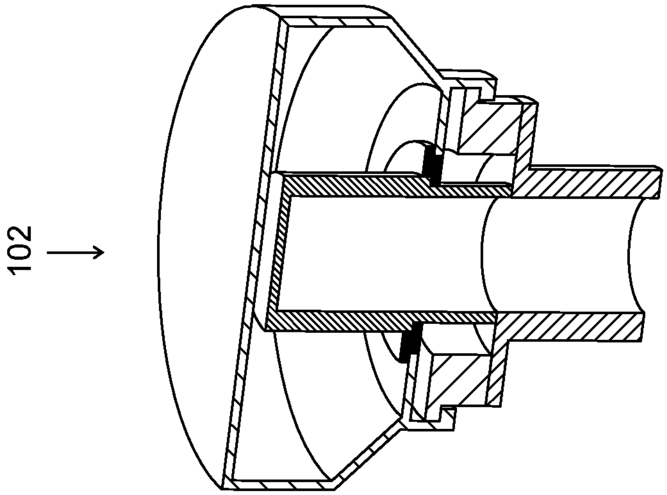
FIG. 11E is a perspective view of the embodiment of FIG. 11B.

Referring to FIG. 11E, a perspective view of the embodiment 102 of FIG. 11B is shown.

Figure 11F:
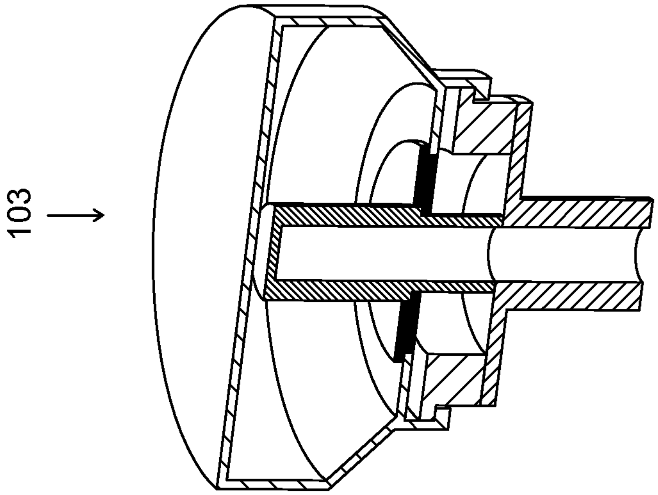
FIG. 11F is a perspective view of the embodiment of FIG. 11C.

Referring to FIG. 11F, a perspective view of the embodiment 103 of FIG. 11C is shown.

Figure 12C:
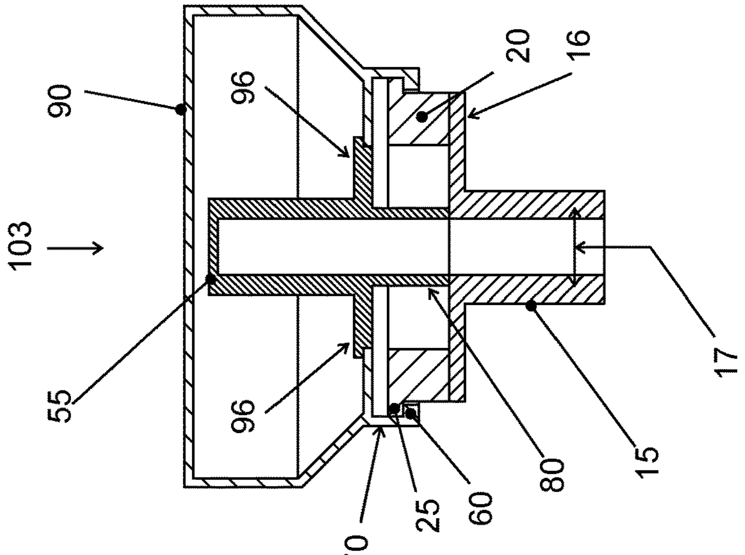
FIG. 12C is a top cross-sectional view of an embodiment of a touch contact coupling assembly having a circular waveguide with a smaller diameter than the embodiment of FIG. 12B with a larger integrated spacer.
Figure 12B:
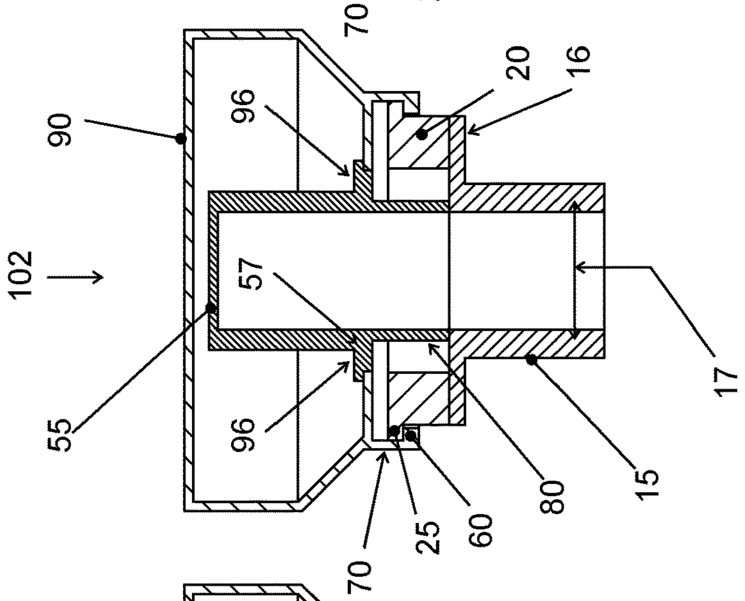
FIG. 12B is a top cross-sectional view of an embodiment of a touch contact coupling assembly having a circular waveguide with a smaller diameter than the embodiment of FIG. 12A with an integrated spacer.
Figure 12A:
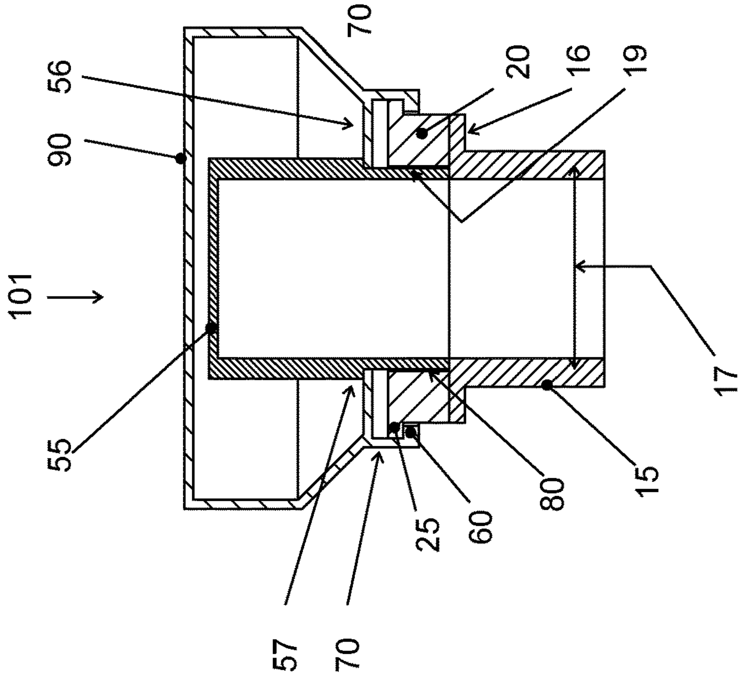
FIG. 12A is a top cross-sectional view of an embodiment of a touch contact coupling assembly having a circular waveguide.

Referring to FIG. 12A, a coupling assembly 101 is shown with a touch contact type connection that is identical to the embodiment as shown in FIG. 11A.

Referring to FIG. 12B, a coupling assembly 102 is shown with a touch contact type connection that is identical to the embodiment as shown in FIG. 11B, except that an integrated spacer 96 is used instead of a separate spacer 95 of FIG. 11B.

Referring to FIG. 12C, a coupling assembly 103 is shown with a touch contact type connection that is identical to the embodiment as shown in FIG. 11C, except that an integrated spacer 96 is used instead of a separate spacer 95 of FIG. 11C.

Figures 12D, 12E, 12F:
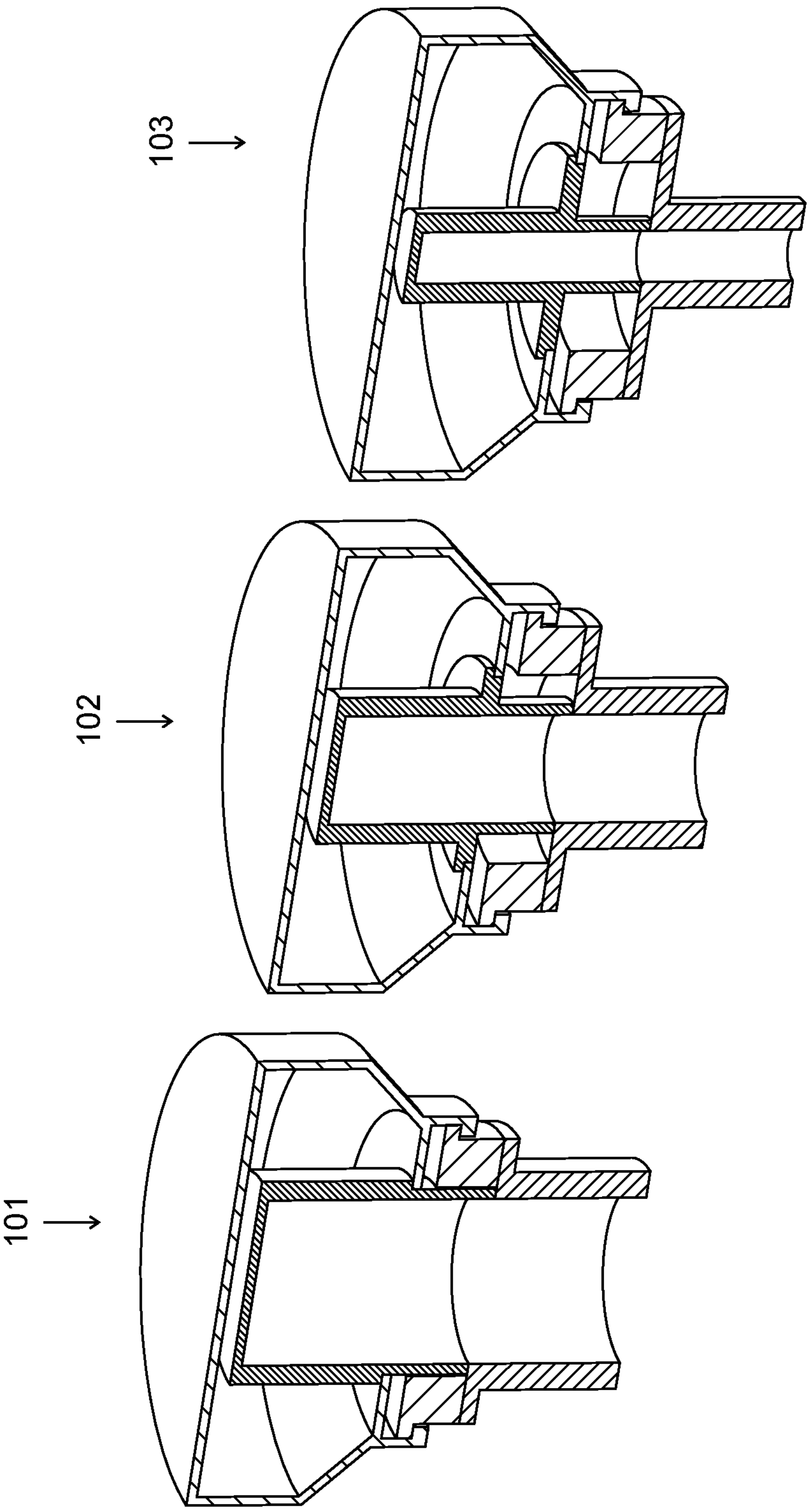
FIG. 12D is a perspective view of the embodiment of FIG. 12A.
FIG. 12E is a perspective view of the embodiment of FIG. 12B.
FIG. 12F is a perspective view of the embodiment of FIG. 12C.

Referring to FIG. 12D, a perspective view of the embodiment 101 of FIG. 12A is shown.

Referring to FIG. 12E, a perspective view of the embodiment 102 of FIG. 12B is shown.

Referring to FIG. 12F, a perspective view of the embodiment 103 of FIG. 12C is shown.

Figure 13A:
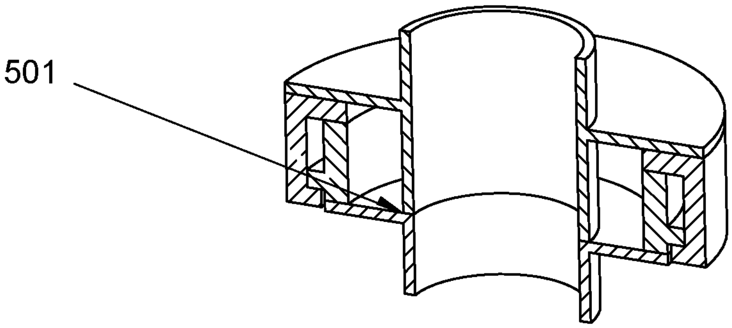
FIG. 13A is a perspective cross-sectional view of a touch contact type coupling assembly.

Referring to FIG. 13A, a coupling assembly 501 of the contact touch type is shown. Examples of the contact touch type 501 are shown and described in FIGS. 11A-11F and 12A-12F, and FIG. 14. In some embodiments, the contact touch type allows easier connection of non-circular waveguides, such as square, triangular or other shapes, as the insertion type coupling assembly 502 (FIG. 13B) or offset diameter type 503 (FIG. 13C) may not allow a non-circular waveguide to rotate during locking or other types of adjustments.

Figure 13B:
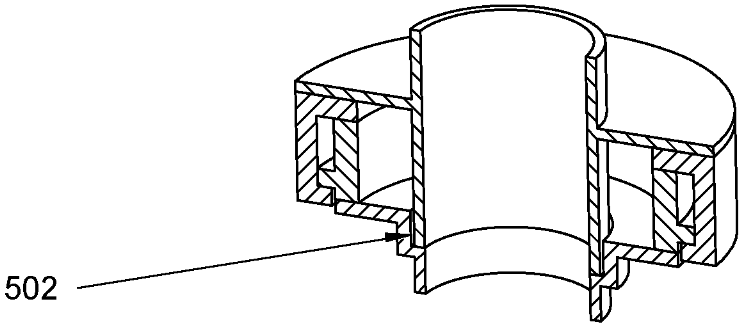
FIG. 13B is a perspective cross-sectional view of an insertion type coupling assembly.

Referring to FIG. 13B, a coupling assembly of the insertion type coupling assembly 502 is shown. Examples of the insertion type coupling assembly 502 are shown and described in FIGS. 7A-7F and 8A-8F.

Figure 13C:
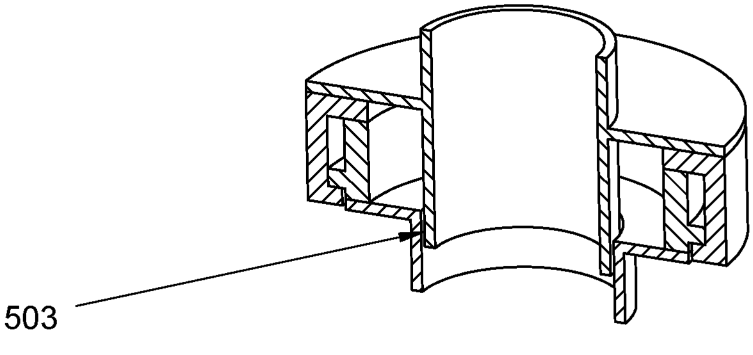
FIG. 13C is a perspective cross-sectional view of a diameter offset coupling assembly.

Referring to FIG. 13C, a coupling assembly of the diameter offset type coupling assembly 503 is shown. Examples of the diameter offset type coupling assembly 503 are shown and described in FIGS. 9A-9F and 10A-10F.

Figure 14:
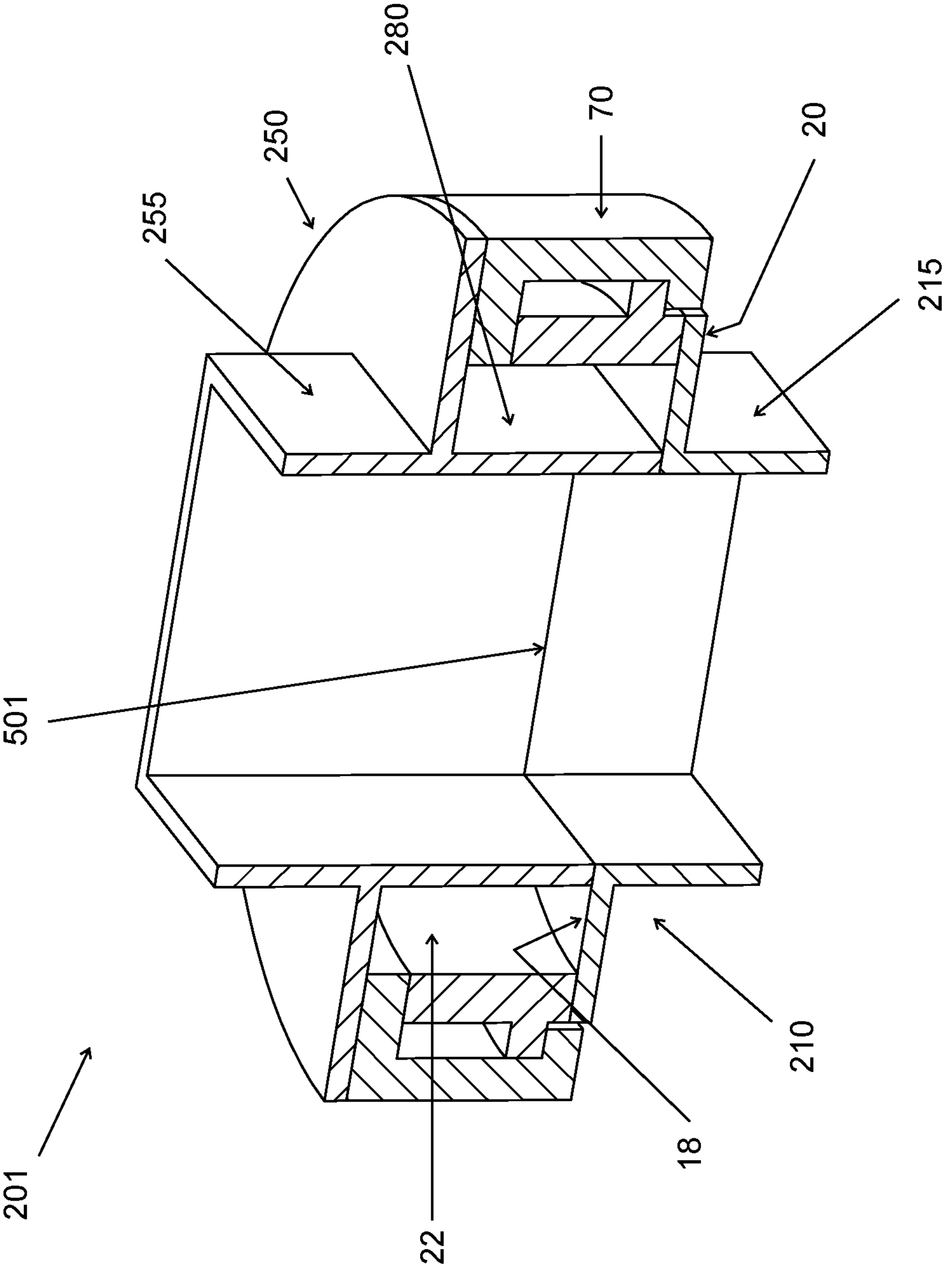
FIG. 14 is a perspective cross-sectional view of a touch contact coupling having a square waveguide.

Referring to FIG. 14, a coupling assembly 201 with square waveguides 255, 215 and square inner portion 280 is shown, connected with a contact touch type coupling 501 as described above. For square, and other non-circular wave guide configurations, a contact touch type coupling 501 is used, along with an additional gap 22 between the wall of inner portion 280 and the inner wall of cylindrical portion 20, so that the inner portion 280 may freely rotate within the internal area between portions 20 and 70, when portions 210 and 250 are connected.

Figure 15B:
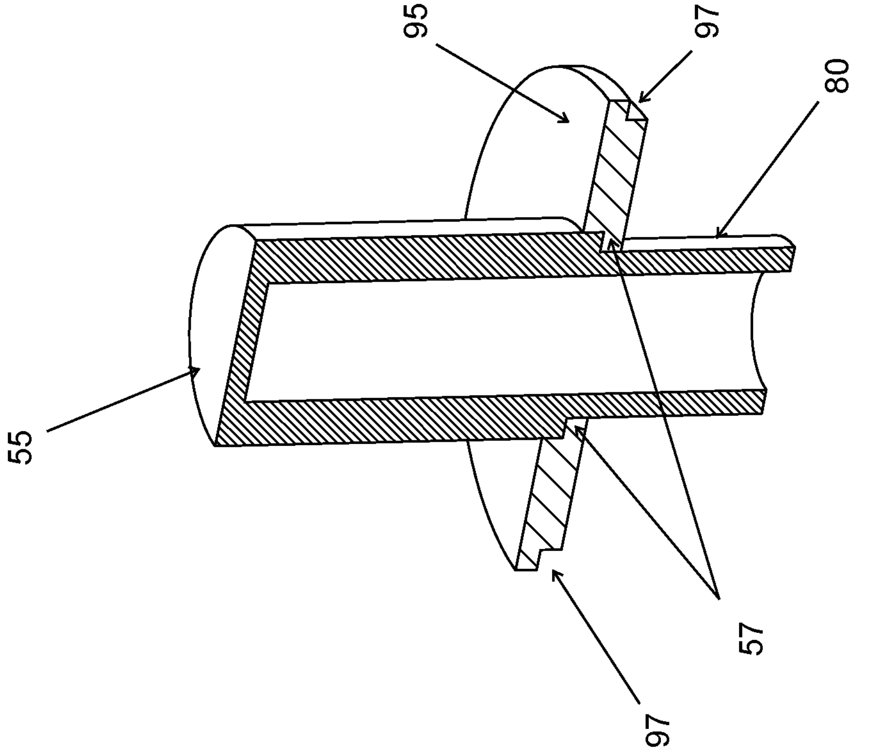
FIG. 15B is a perspective cross-sectional view of a circular waveguide with a smaller diameter than the embodiment of FIG. 15A in contact with a larger spacer.
Figure 15A:
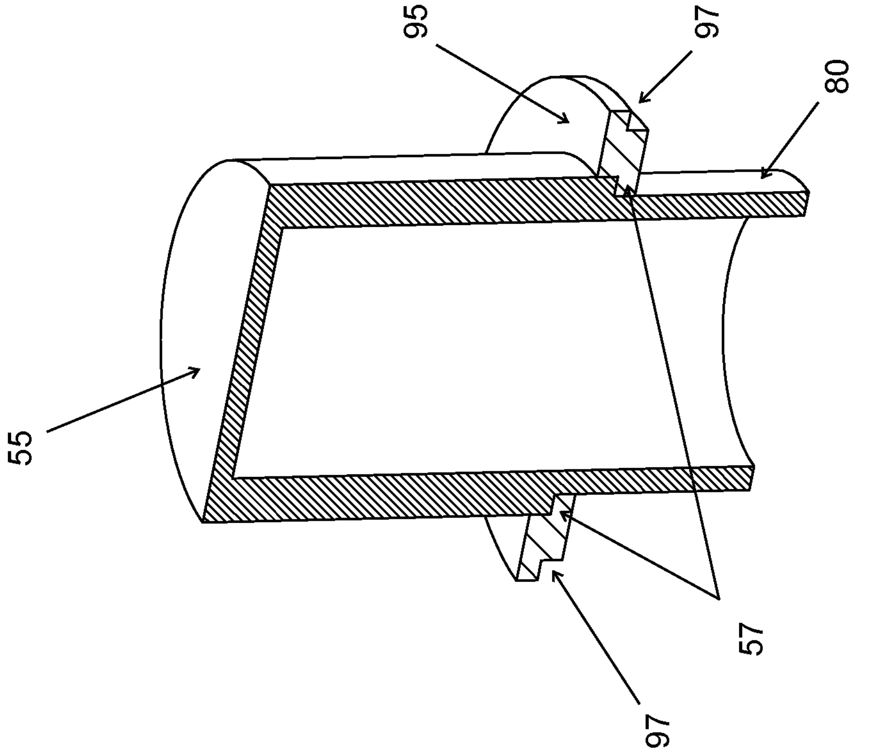
FIG. 15A is a perspective cross-sectional view of a circular waveguide in contact with a spacer.
Figures 16A, 16B:
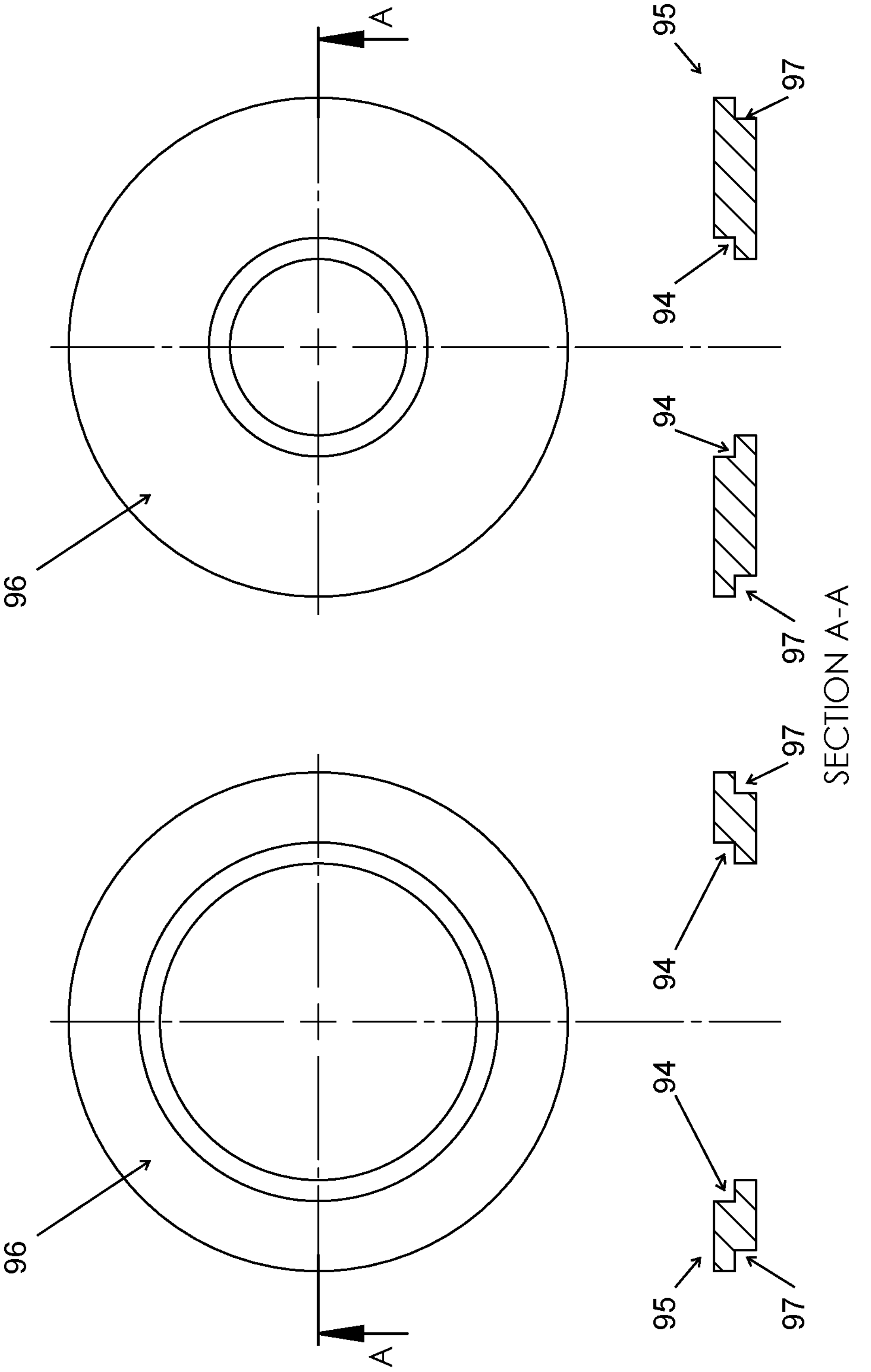
FIG. 16A is a top view and side cross sectional view of the spacer as shown in FIG. 15A.
FIG. 16B is a top view and side cross sectional view of the spacer as shown in FIG. 15B.

Referring to FIG. 15A a perspective view of a cross sectional portion of a second waveguide portion 55 is shown in contact with a cross sectional portion of a separate spacer 95. Protrusions 57 of the wave guide portion 55 come into contact with an indented portion 94 on a first side pf the spacer 95 as shown in FIG. 16A. Indented portions 97 on a second side of the spacer 95 come in contact with the flat surface 56 of the coupling. The spacer 95 retains the second waveguide portion 55 in place when the waveguide size or diameter is smaller than the hole in the standard sized locking portion 70 as described above. Waveguide portion 55 and spacer 95 are shown and described in FIGS. 7B, 7E, 9B, 9E, 11B and 11E.

Referring to FIG. 15B a perspective view of a cross sectional portion of a smaller second waveguide portion 55 is shown in contact with a cross sectional portion of a separate larger spacer 95. Waveguide portion 55 and spacer 95 are shown and described in FIGS. 7C, 7F, 9C, 9F, 11C and 11F.

Referring to FIG. 16A a top view and side cross sectional view of the spacer 95 as shown in FIG. 15A is illustrated.

Referring to FIG. 16B a top view and side cross sectional view of the spacer 95 as shown in FIG. 15B is illustrated.

Figure 17B:
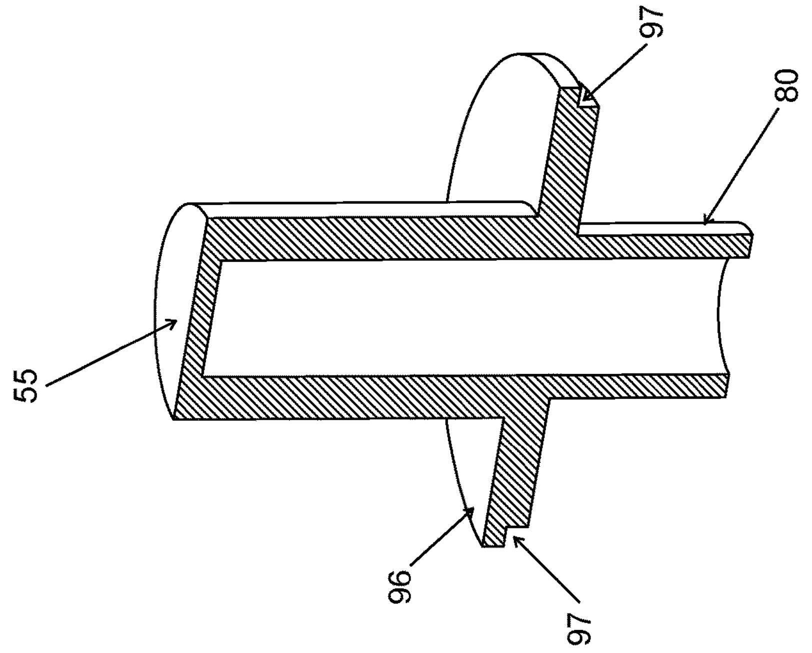
FIG. 17B is a perspective cross-sectional view of a circular waveguide with a smaller diameter than the embodiment of FIG. 17A with a larger integrated spacer.
Figure 17A:
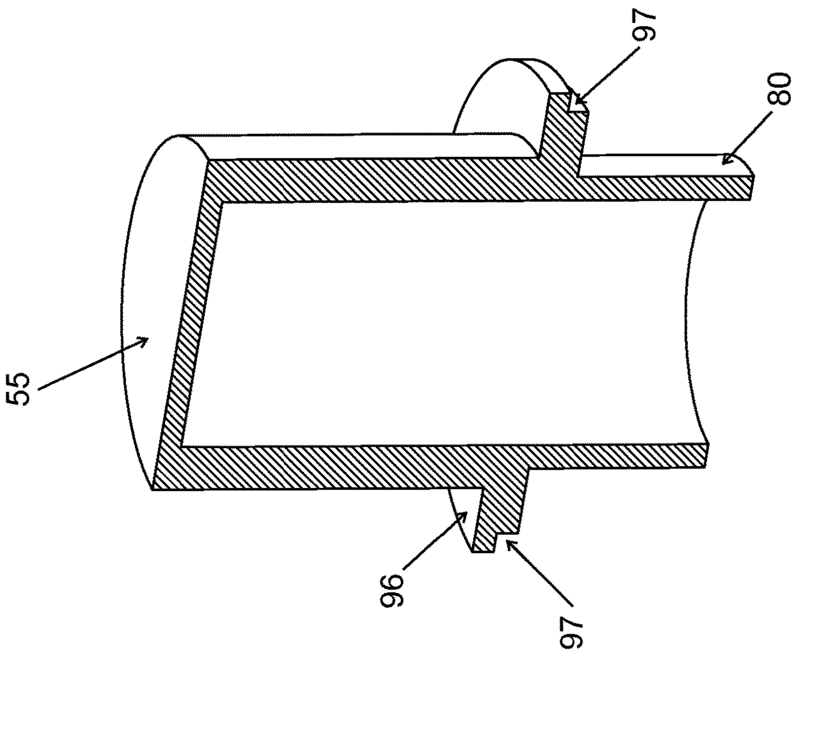
FIG. 17A is a perspective cross-sectional view of a circular waveguide with an integrated spacer.

Referring to FIG. 17A a perspective view of a cross sectional portion of a waveguide 55 is shown, with an integrated spacer 96. Indented portions 97 on the integrated spacer 96 come in contact with the flat surface 56 of the coupling. Waveguide portion 55 and integrated spacer 96 are shown and described in FIGS. 8B, 8E, 10B, 10E, 12B and 12E.

Referring to FIG. 17B a perspective view of a cross sectional portion of a smaller waveguide 55 is shown with a larger integrated spacer 96. Waveguide portion 55 and integrated spacer 96 are shown and described in FIGS. 8C, 8F, 10C, 10F, 12C and 12F.

Figure 18:
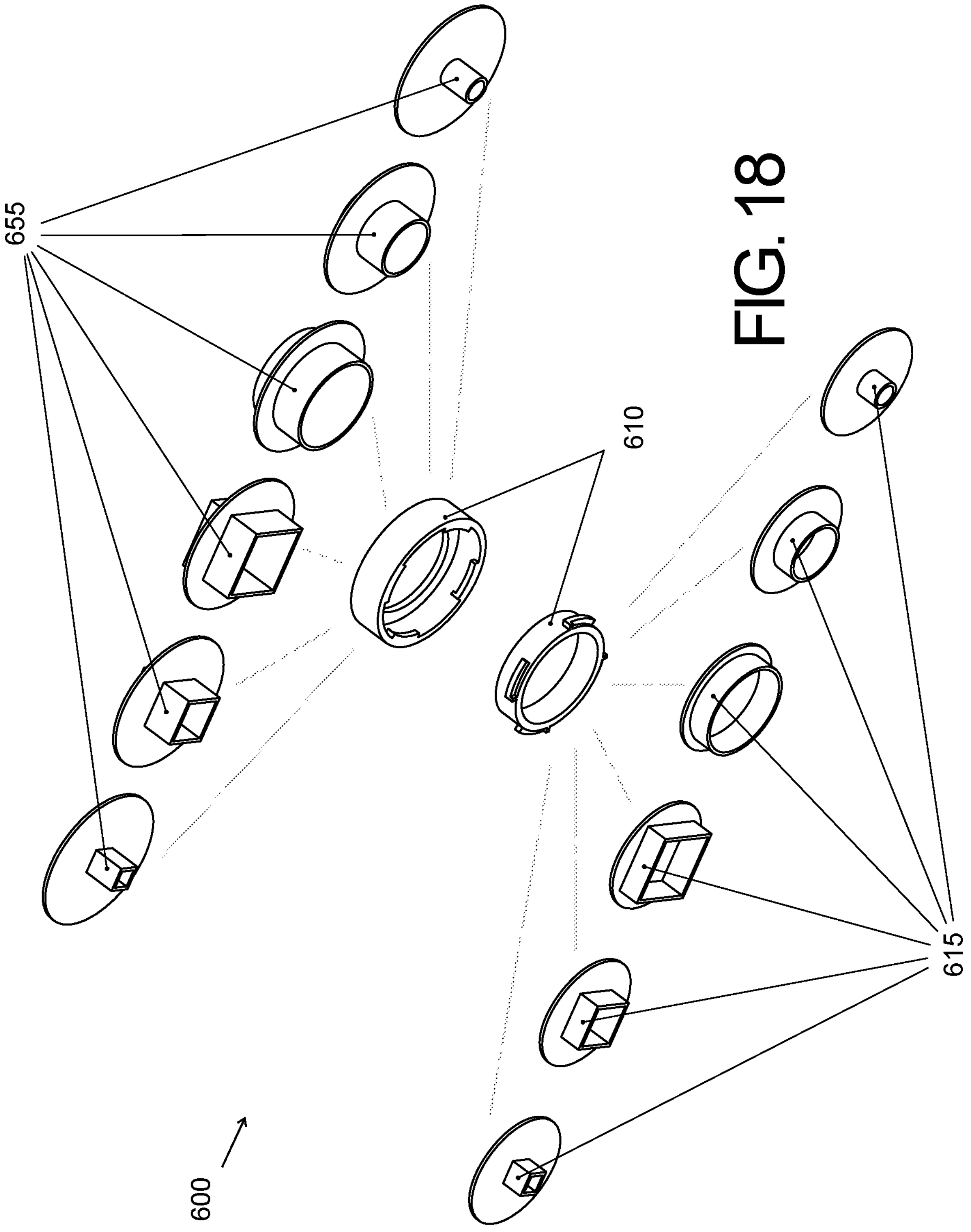
FIG. 18 is a top perspective view of wave guides of different shapes and sizes that can be coupled together with a locking mechanism.

Referring to FIG. 18, a coupling assembly 600 is shown. Coupling assembly 600 is a example of the coupling assemblies 101, 102, 103, 201, and 202 as described above, and has a first waveguide portion 615, and a second waveguide portion 655 that are connected together by a locking mechanism 610. Coupling assembly 600 can have any sized or shaped waveguide 615 connected to any sized and shaped waveguide portion 655, connected together by a locking mechanism 610 that remains that same size and shape, regardless of whether the waveguide portions on either end of the locking mechanism are reduced in size, or vary in shape, size or diameter, thereby providing a quick swappable interface for changing waveguide shapes and sizes as needed for field installations. This feature also allows for easier manufacturing of the locking mechanism, and first and second waveguide portions, thereby reducing costs. While locking mechanism 610 is shown to be a twist type locking mechanism similar to those described above, locking mechanism 610 can be any type of locking mechanism such as for example those described in FIGS. 19 and 20A below. Similarly, while only square and circular waveguides are shown at 615 and 655, any shaped waveguide can be used, such as triangular, rectangular, oblong, elliptical and other commonly used waveguide shapes.

Figure 19:
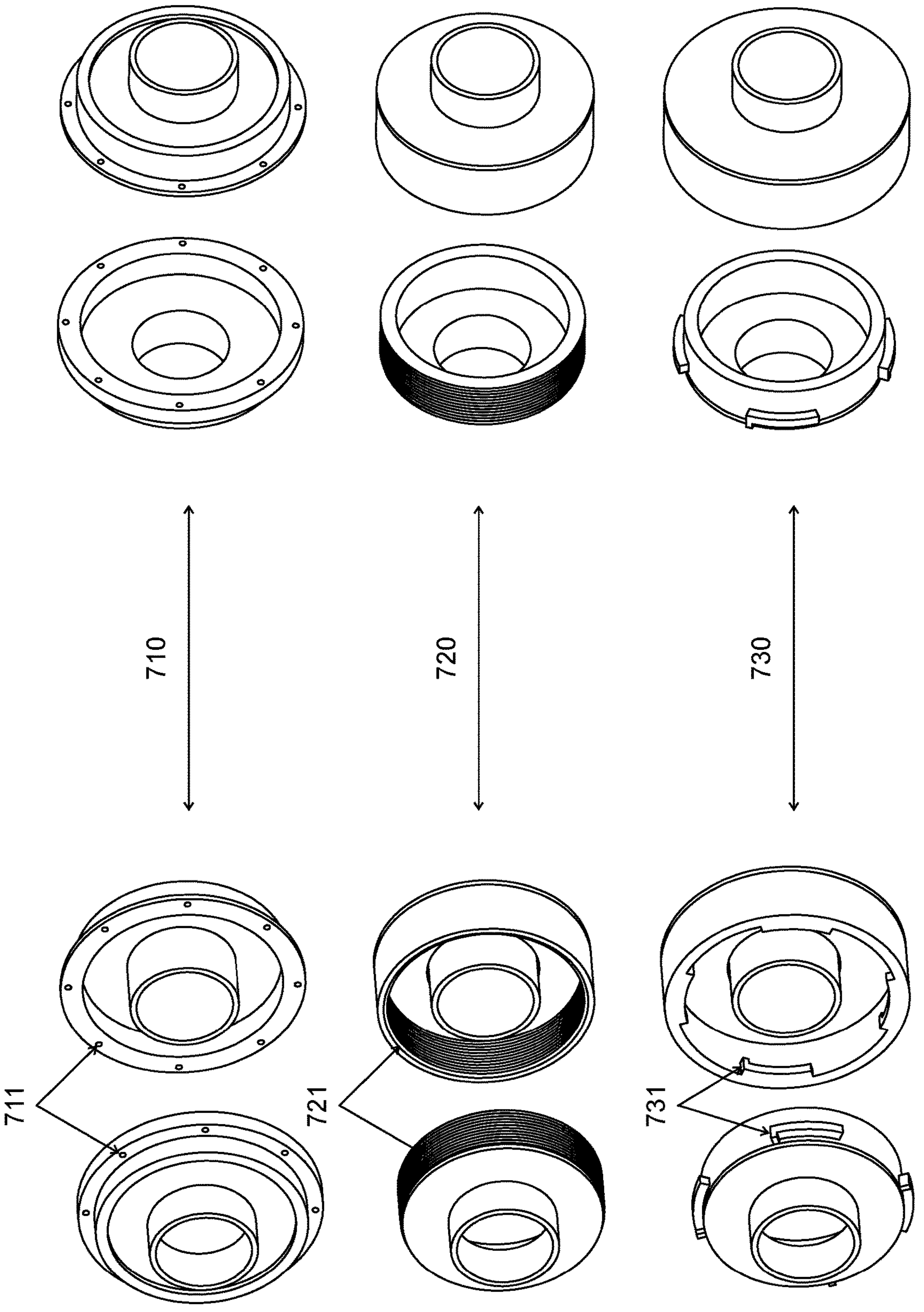
FIG. 19 provides side perspective views of different locking mechanism coupling types.

Referring to FIG. 19, three examples of possible locking mechanisms 610 are shown as mechanisms 710, 720 and 730. Locking mechanism 710 can be connected together by screws or bolts through holes 711 around the circumference of the locking mechanism. Locking mechanism 720 can be connected by twisting a first portion with threads 721 into a second portion with corresponding grooves (also referred to with number 721) around the circumference of the locking mechanism. Locking mechanism 730 is similar to the twist type locking mechanism as shown and described in FIGS. 1-14, with the addition of a locking tab protrusion 731 on both protrusions 25 and tabs 60. When cylindrical portions 20 and 70 and locked together by twisting, protrusions 731 located on protrusions 25 and tabs 60 come into contact with each other and prevent further rotation. A further locking mechanism 800 is described in FIGS. 20A and 20B.

Figure 20B:
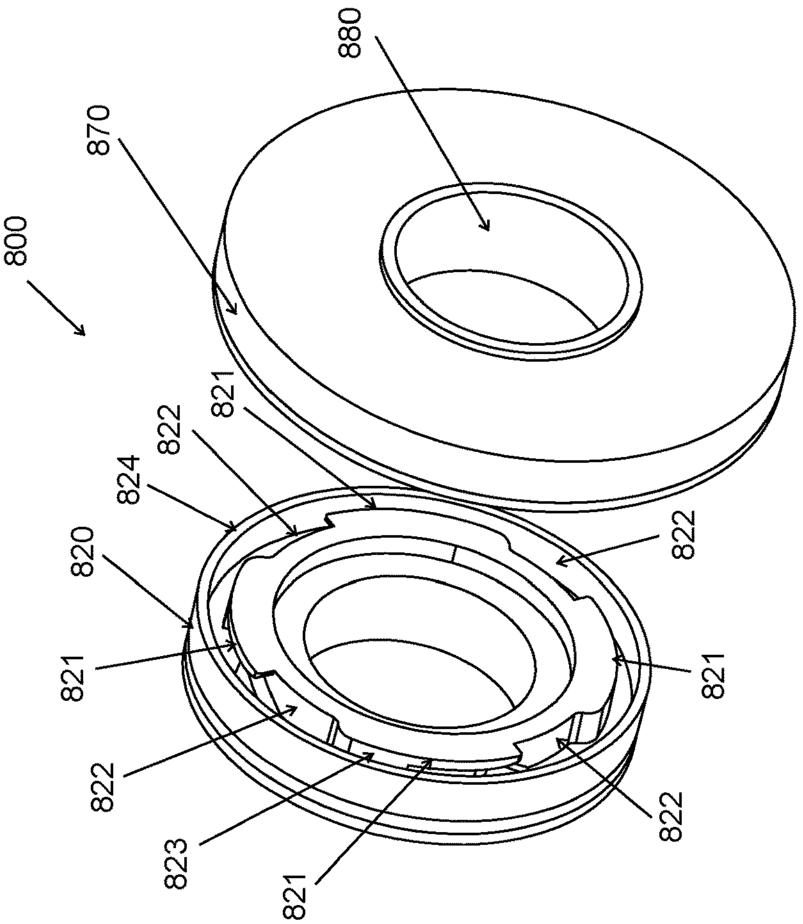
FIG. 20B is a opposite perspective view of the embodiment of the twist type locking coupling shown in FIG. 20A.
Figure 20A:
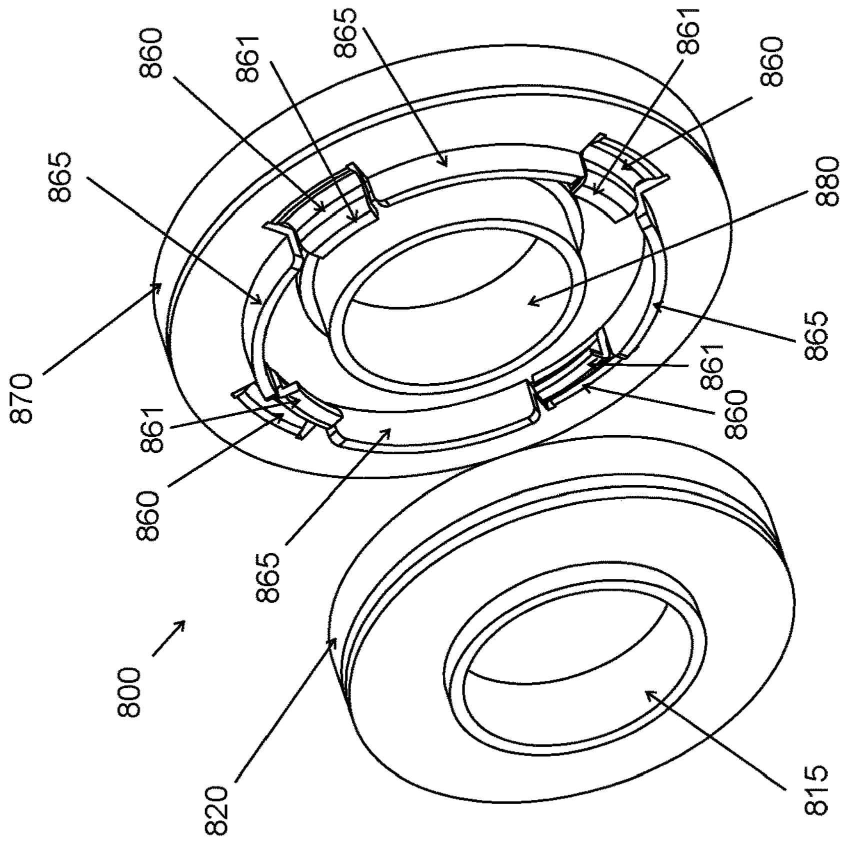
FIG. 20A is a side perspective view of an embodiment of a twist type locking coupling.

Referring to FIGS. 20A and 20B, a locking mechanism 800 is shown that can be used as a locking mechanism 610 as shown in FIG. 18. Locking mechanism 800 has a first portion 820 and second portion 870. First portion 820 can have a first circular waveguide portion 815. On the side of first portion 820 that interfaces with and locks together with second portion 870, multiple ridges 821 of FIG. 20B are provided, and spaced apart by gaps 822 (FIG. 20B) that are arranged circumferentially around the center of waveguide portion 815. A locking end 823 (FIG. 20B) is present adjacent and connected to each ridge 821 and preceding each gap 822. A center axis of the locking mechanism passes through a center of the waveguide 815. The ridges 821 are formed perpendicularly to the center axis and extend away from the center of the first locking portion 820. Locking end 823 connects to the ridges 821 and extends parallel to the center axis of the locking portion 820.

Second portion 870 can have a circular waveguide portion 880 and has flexible protrusions 860 (FIG. 20A) that extend outward from the second portion 870 toward the direction of first portion 820 when the locking mechanism 800 is aligned to join together. Protrusions 860 have a portion 861 that extends inward toward the center of second portion 870. Protrusions 860 can be slightly curved as shown to match the curvature of ridges 821 (FIG. 20B). Protrusions 860 are separated by curved protrusions 865 which match the curvature of the circular gap 824 in portion 820. In some embodiments, the number of protrusions 860 match the number of ridges 821, and gaps 822 (FIG. 20B). A center axis of the locking mechanism passes through a center of the waveguide 880. The protrusions 860 extend in a plane parallel to the center axis towards locking portion 820 when portions 820 and 870 are aligned to connect. A connection portion 861 of each protrusion 860 extends toward the center of the locking mechanism in a plane perpendicular to the center axis of the locking mechanism, so that each portion 861 is parallel to the ridges 821.

Figure 21A:
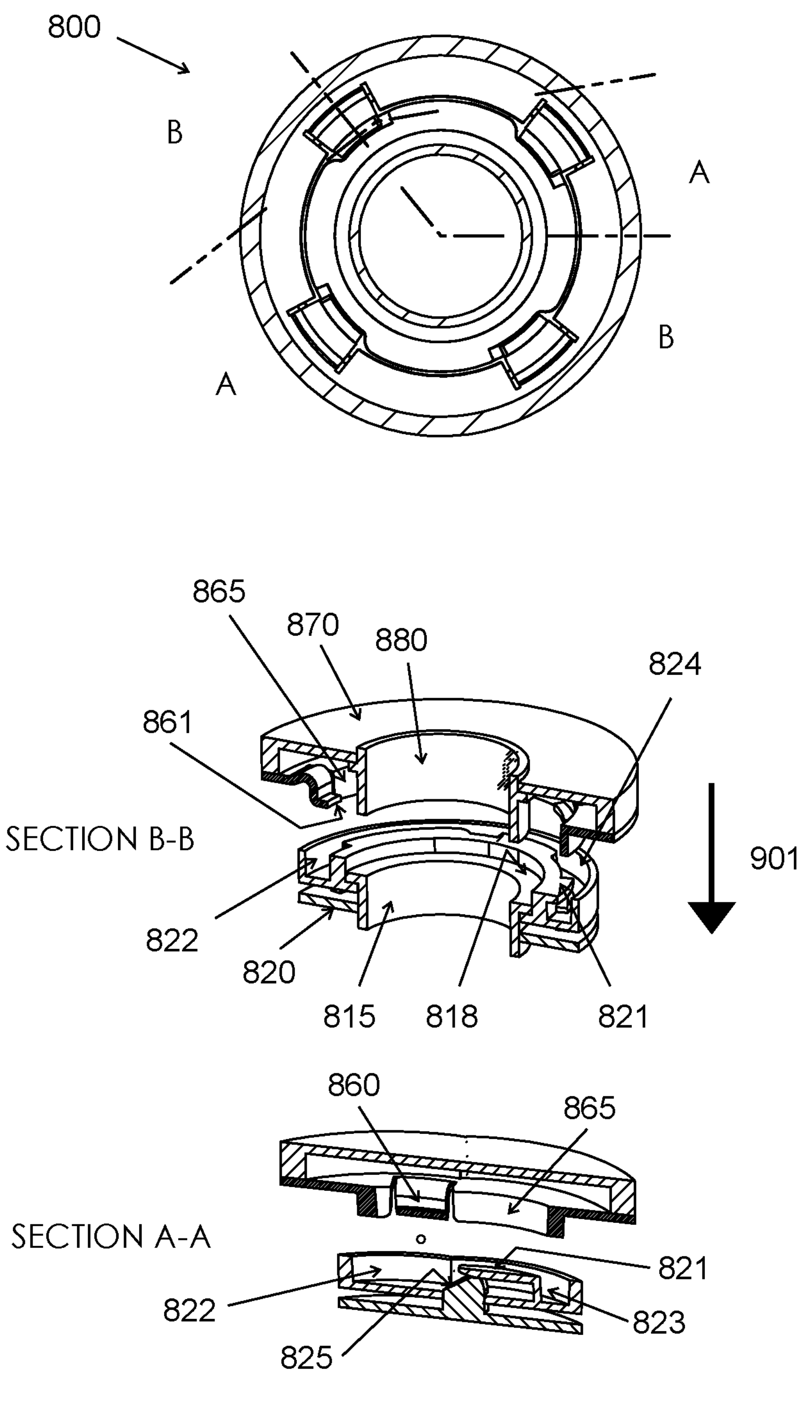
FIG. 21A is a top partial cross-sectional view of the coupling of FIG. 20A, and side cross-sectional views of the couplings prior to connection.

Referring to FIG. 21A, a first step for connecting the first and second portions 820 and 870 of locking mechanism 800 is shown. First portion 870 is aligned so that protrusions 860 align with gaps 822 so that when portion 870 is moved in direction 901, protrusions 860 go through gaps 822, protrusions 865 go through circular gap 824 and waveguide 880 comes to rest and into contact with surface 818. Locking tab 825 has an angled surface portion that comes into contact with portion 861 when the locking mechanism is connected and then twisted. When at rest an upward biasing force in the opposite direction of arrow 901, ensures the top portion of the angled surface of locking tab 25 contacts an inner surface of ridge 821. The biasing force can be provided by various means, such as a spring, or the bias of materials of the locking tab 825.

Figure 21B:
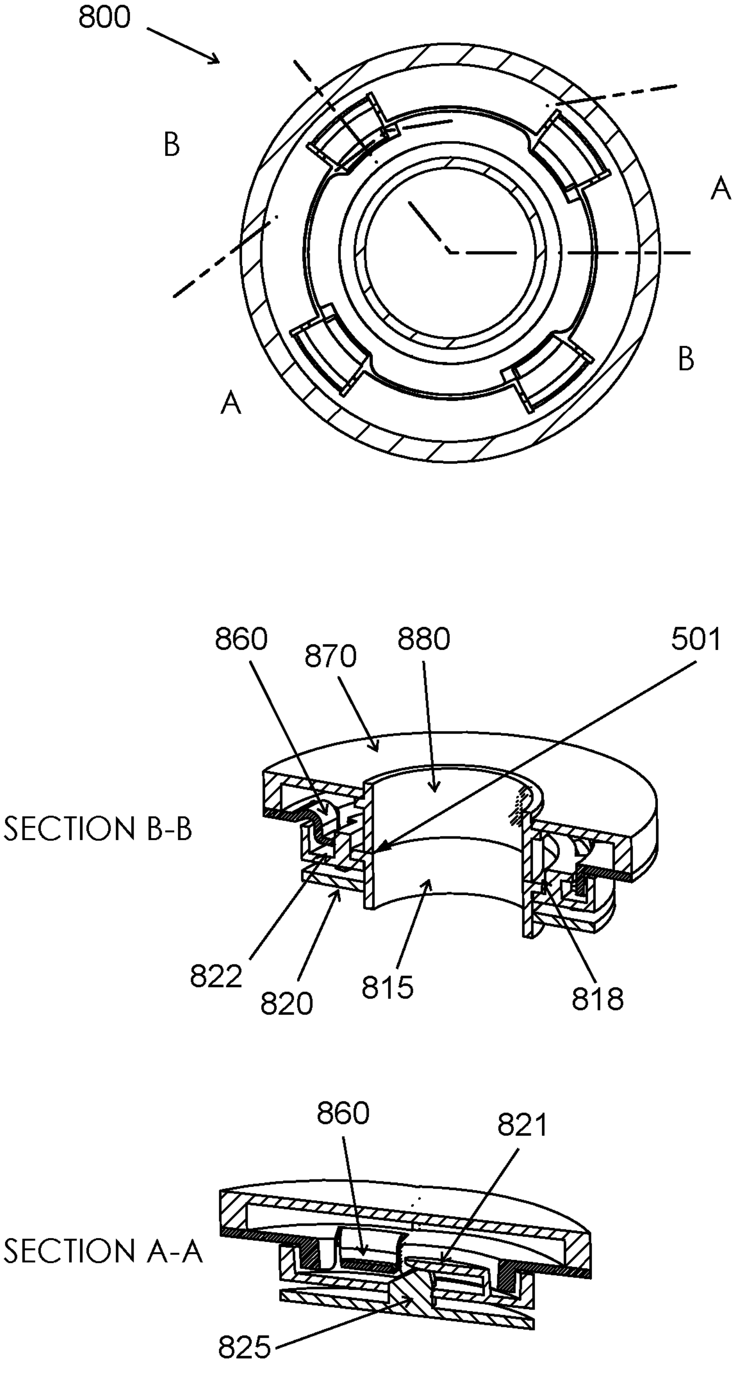
FIG. 21B is a top partial cross-sectional view of the coupling of FIG. 20A, and side cross-sectional views of the coupling during connection of the couplings and prior to twisting the couplings.

Referring to FIG. 21B, a second step for connecting the first and second portions 820 and 870 of locking mechanism 800 is shown. Once the portions 820 and 870 are brought together, protrusions 860 go through gaps 822 (FIG. 20B), protrusions 865 go through circular gap 824 and waveguide 880 comes to rest and into contact with surface 818. Locking mechanism 800 is a touch contact type locking mechanism 501.

Figure 21C:
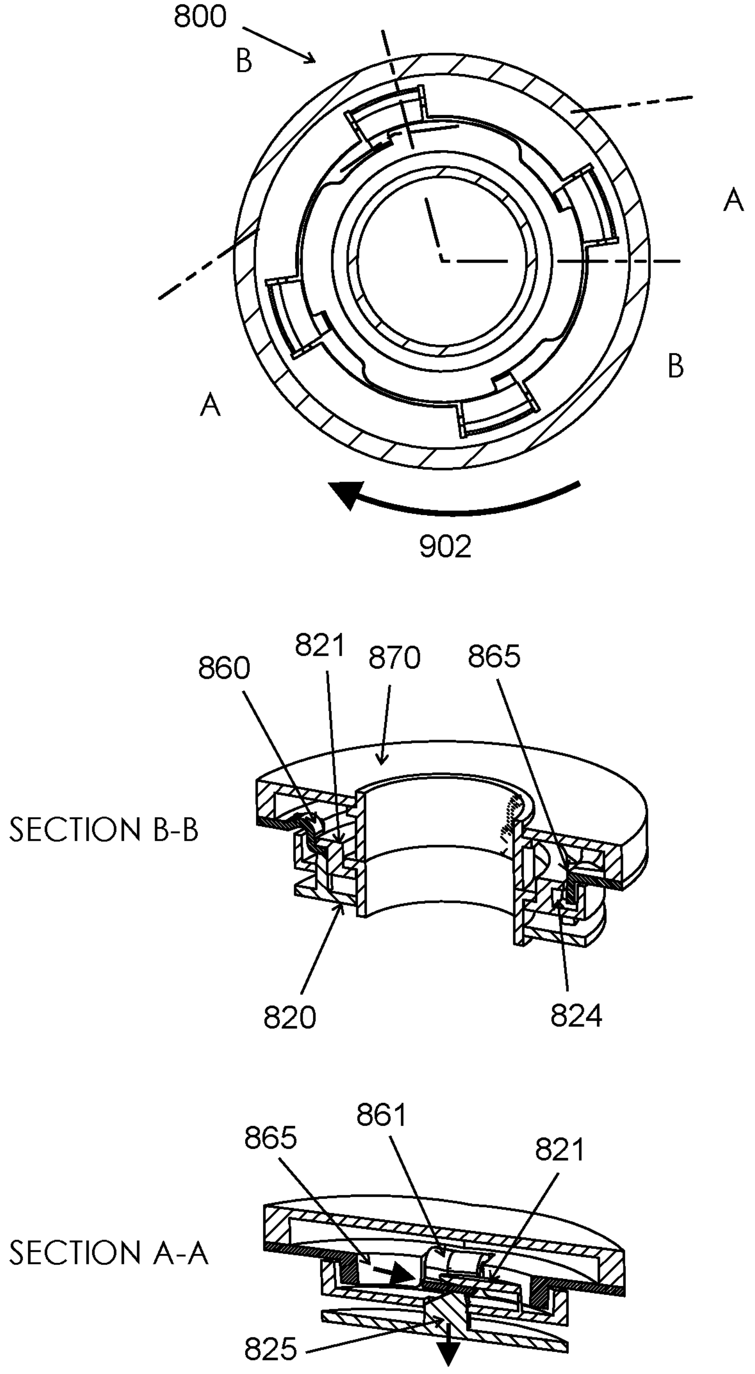
FIG. 21C is a top partial cross-sectional view of the coupling of FIG. 20A, and side cross-sectional views of the coupling during connection of the couplings and during twisting of the couplings.

Referring to FIG. 21C, a third step for connecting the first and second portions 820 and 870 of locking mechanism 800 is shown. FIG. 21C shows the beginning of the twisting motion 902 a user must use on portion 870, while keeping portion 820 from moving. In some embodiments, the twisting motion 902 for turning portion 870 is a clockwise motion. During twisting, each portion 861 of each protrusion 860 meets an inner surface of each ridge 821. The flexible structure of protrusion 860 provides a biasing or clamping force when protrusions 860 come into contact with the inner surfaces of ridges 821, so that the protrusions 860 pull the ridges 821 in a direction opposite of direction 901 as shown in FIG. 21A. During the twisting motion 902, protrusions 860 come into contact with an angled surface of locking tab 825, and force the locking tab downward in direction 901, as the protrusion 860 passes over the angled surface.

Figure 21D:
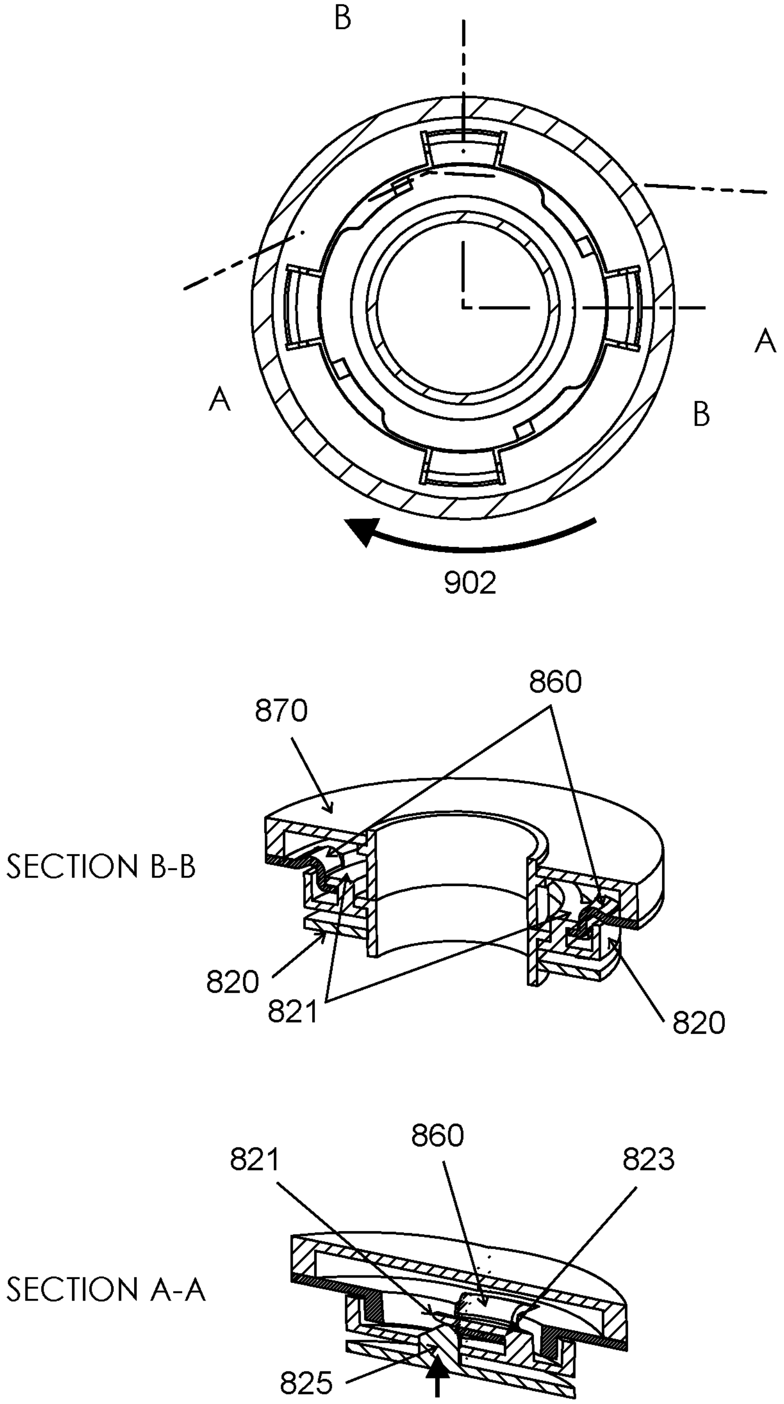
FIG. 21D is a top partial cross-sectional view of the coupling of FIG. 20A, and side cross sectional views of the coupling during connection of the couplings after twisting of the couplings is completed and the couplings are locked together.

Referring to FIG. 21D, a fourth and final step for connecting the first and second portions 820 and 870 of locking mechanism 800 is shown. Rotation in clockwise direction 902 is completed when each protrusion 860 comes into contact with and is stopped by locking end portion 823. Locking end portion 823 connects each ridge 821 to the rest of portion 820 as shown. Once protrusion 860 comes into contact with locking portion 823, it no longer has contact with the angled portion of locking tab 825, and therefore no longer presses locking tab 825 downward. Locking tab 825 then returns to its initial resting position by moving back upwards in a direction opposite direction 901, and comes into contact with the inner surface of ridge 821. The protrusion 860 is then locked in place, preventing movement in a counter clock wise direction opposite that of direction 902. In some embodiments, a locking tab 825 is present at each location that a ridge 821 is present. In some embodiments, only one locking tab 825 is present to lock only one protrusion 860. The number of locking tabs 825 can vary as needed. In some embodiments, one, two, three, four or more locking tabs can be used in a locking mechanism 800.

A locking release mechanism (not shown) can be used by a user to release or lower the locking tab 825 to free each locked protrusion 860, thereby allowing the locking mechanism 800 to be disconnected. In some embodiments, a user can turn the portion 870 with enough force to overcome the biasing force of locking tab 825, thereby forcing the locking tab down in a direction 901, thereby releasing each locked protrusion 860. Locking mechanism 800 can be used with non-circular waveguides such as square, triangular, oblong, elliptical, and other commonly used waveguide shapes.

It should also be noted that the terms “first”, “second”, “third”, “upper”, “lower”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A coupling assembly comprising:

a first waveguide having a first end;

a second waveguide having a second end;

a locking mechanism having a fixed size, wherein the locking mechanism has a first locking portion and a second locking portion, wherein the first wave guide is connected to the first locking portion and the second waveguide is connected to the second locking portion, wherein the first locking portion and second locking portion are connected to each other, wherein the first end contacts the second end, and there is no insertion of the first wave guide into the second wave guide or the second wave guide into the first wave guide, and wherein the first wave guide and the second waveguide are rotatable with respect to one another.

2. The coupling assembly of claim 1, wherein the first waveguide and second waveguide are of the same shape.

3. The coupling assembly of claim 1, wherein the first waveguide and second waveguide are different shapes.

4. The coupling assembly of claim 1, wherein the first waveguide and second waveguide are different sizes.

5. The coupling assembly of claim 1, wherein the first waveguide and second waveguide are the same size.

6. The coupling assembly of claim 1, wherein the first waveguide and second waveguide are circularly shaped.

7. The coupling assembly of claim 1, wherein the first waveguide and second waveguide are square shaped.

8. The coupling assembly of claim 1, wherein the first waveguide and second waveguide are swappable with waveguides of different shapes and sizes.

9. A method of using the coupling assembly of claim 1, comprising the steps of:

disconnecting the second waveguide from the second locking portion, connecting a smaller waveguide in place of the second waveguide to the second locking portion and using a spacer to securely fasten the smaller waveguide to the second locking portion that has a fixed size.

10. The coupling assembly of claim 1, wherein the locking mechanism is a twist type locking mechanism.

11. The coupling assembly of claim 10, wherein the twist type locking mechanism has a plurality of protrusions extending away from a center of the locking mechanism along an outer circumference of the first portion of the locking mechanism, and a plurality of tabs extending inward toward the center of the locking mechanism with gaps between each of the tabs.

12. Coupling assembly of claim 10, wherein the first portion of the locking mechanism has a plurality of ridges extending in a plane perpendicularly away from a center axis of the locking mechanism that passes through a center of both the first and second waveguides;

wherein the second portion of the locking mechanism has a plurality of protrusions extending in a plane parallel to the center axis in a direction facing the first portion of the locking mechanism, and wherein the plurality of protrusions each have a connection portion extending towards the center of the second waveguide, so that the plurality of ridges and the connection portions are parallel.

13. The coupling assembly of claim 12, wherein the plurality of ridges have gaps between each of the ridges, so that the plurality of protrusions can fit between the gaps.

14. The coupling assembly of claim 12, wherein the plurality of protrusions have a number that are equal to a number of the gaps, and equal to a number of the plurality of ridges.

15. A coupling assembly comprising:

a first waveguide having a first end;

a second waveguide having a second end; and a locking mechanism having a fixed size, wherein the locking mechanism has a first locking portion and a second locking portion, wherein the first wave guide is connected to the first locking portion and the second waveguide is connected to the second locking portion, wherein the first locking portion and second locking portion are connected to each other, and wherein the first waveguide has an offset at the first end, so that an inner diameter of the first waveguide at the first end is greater than an inner diameter of the second waveguide at the second end, and the second waveguide is inserted into the first waveguide at the first end.

16. A coupling assembly comprising:

a first waveguide having a first end;

a second waveguide having a second end; and a locking mechanism having a fixed size, wherein the locking mechanism has a first locking portion and a second locking portion, wherein the first wave guide is connected to the first locking portion and the second waveguide is connected to the second locking portion, wherein the first locking portion and second locking portion are connected to each other, and wherein the first waveguide has an inner diameter that is larger than an outer diameter of the second waveguide, so that the second end of the second waveguide is inserted into the first waveguide at the first end.

* * * * *